(12) United States Patent
Roy et al.

(10) Patent No.: US 8,713,001 B2
(45) Date of Patent: Apr. 29, 2014

(54) SYSTEMS AND RELATED METHODS OF USER-GUIDED SEARCHING

(76) Inventors: Asim Roy, Phoenix, AZ (US); Patrick Mackin, Rapid City, SD (US)

(*) Notice: Subject to any disclaimer, the term of this patent is extended or adjusted under 35 U.S.C. 154(b) by 1282 days.

(21) Appl. No.: 12/170,343

(22) Filed: Jul. 9, 2008

(65) Prior Publication Data

US 2009/0019036 A1   Jan. 15, 2009

Related U.S. Application Data

(60) Provisional application No. 60/959,147, filed on Jul. 10, 2007.

(51) Int. Cl.
*G06F 17/30* (2006.01)

(52) U.S. Cl.
USPC .......................................... 707/722; 707/765

(58) Field of Classification Search
CPC .............. G06F 17/30; G06F 17/30029; G06F 17/30699; G06F 17/30761; G06F 17/30648
See application file for complete search history.

(56) References Cited

U.S. PATENT DOCUMENTS

| | | | | |
|---|---|---|---|---|
| 5,164,992 A * | 11/1992 | Turk et al. | .................. | 382/118 |
| 6,029,195 A * | 2/2000 | Herz | .................. | 725/116 |
| 6,704,692 B1 * | 3/2004 | Banerjee et al. | .................. | 702/189 |
| 6,728,752 B1 * | 4/2004 | Chen et al. | .................. | 709/203 |
| 6,947,930 B2 | 9/2005 | Anick et al. | | |
| 7,072,888 B1 | 7/2006 | Perkins | | |
| 7,130,849 B2 * | 10/2006 | Yayoi et al. | .................. | 1/1 |
| 7,483,871 B2 * | 1/2009 | Herz | .................. | 1/1 |
| 7,783,630 B1 * | 8/2010 | Chevalier et al. | .................. | 707/723 |
| 2002/0042793 A1 * | 4/2002 | Choi | .................. | 707/6 |
| 2003/0037041 A1 * | 2/2003 | Hertz | .................. | 707/1 |
| 2003/0110181 A1 * | 6/2003 | Schuetze et al. | .................. | 707/103 R |
| 2004/0059729 A1 * | 3/2004 | Krupin et al. | .................. | 707/3 |
| 2004/0068486 A1 * | 4/2004 | Chidlovskii | .................. | 707/3 |
| 2004/0186827 A1 * | 9/2004 | Anick et al. | .................. | 707/3 |
| 2005/0055344 A1 * | 3/2005 | Liu et al. | .................. | 707/3 |
| 2005/0165766 A1 * | 7/2005 | Szabo | .................. | 707/3 |
| 2005/0234904 A1 * | 10/2005 | Brill et al. | .................. | 707/5 |
| 2006/0235860 A1 * | 10/2006 | Brewer et al. | .................. | 707/100 |
| 2006/0259481 A1 * | 11/2006 | Handley | .................. | 707/5 |
| 2007/0174235 A1 * | 7/2007 | Gordon | .................. | 707/2 |
| 2007/0192166 A1 | 8/2007 | Van Luchene | | |
| 2008/0005075 A1 * | 1/2008 | Horvitz et al. | .................. | 707/3 |

* cited by examiner

*Primary Examiner* — Son T Hoang

(57) ABSTRACT

Systems and related methods of user-guided searching using preference feedback from user searching to arrive at user-preferred ordered results from a large collection of objects.

45 Claims, 7 Drawing Sheets

SYSTEMS AND RELATED METHODS OF USER-GUIDED SEARCHING

CROSS-REFERENCE TO RELATED APPLICATION

The present application is related to and claims priority from prior provisional application Ser. No. 60/959,147, filed Jul. 10, 2007, entitled "INTERACTIVE SEARCH METHOD BASED ON USER PREFERENCES", the contents of which are incorporated herein by this reference and are not admitted to be prior art with respect to the present invention by the mention in this cross-reference section.

BACKGROUND

This invention relates to user-guided searching. More particularly, this invention relates to user-guided searching of a plurality of objects wherein a user may indicate user-preference for a subset of the objects from a large collection to efficiently locate, for the benefit of the user, the most preferred objects from the large collection.

Conventional database searching, including the Internet, is typically performed by querying a particular database. Essentially, a searcher enters some broad search parameters, such as particular keywords, into a database search engine. The searcher then examines and evaluates the results. One typical way in which searchers attempt to get "better" search results is to modify the query and perform another search with the "better" query. Eventually, the searcher typically stops when the searcher has found what is believed to be relevant. This searching process (modifying queries based on past search results) can be a tedious process. Further, such a process does not provably result in searcher-preferred results.

No system exists that gives a searcher the capability to indicate that objects, or alternatives, in a collection are "likable" or "not likable", wherein the searcher's preferences are then ranked according to an approximation of the searcher's value function. Stated another way, no system exists that works to approximate the user's/searcher's value function with enough feedback to optimally rank order objects in a collection. Further, no system exists that gives a searcher the capability to directly compare and refine prior comparisons of objects, such objects defined by discrete attributes, to one another. Even further, no such systems exist that gather searcher feedback at the object level. Still further, no such systems exist that learn a searcher's preferences as the searcher examines and evaluates search results.

Therefore, a need exists for such a system that gives a searcher the capability to indicate that objects, or alternatives, in a collection are "likable" or "not likable", wherein the searcher's preferences are then ranked according to an approximation of the searcher's value function. And, a need exists for a system that gives a searcher the capability to directly compare and refine prior comparisons of objects, such objects defined by discrete attributes, to one another. Also, a need exists for a system that gathers searcher feedback at the object level. And, a need exists for a system that learns a searcher's preferences as the searcher examines and evaluates search results

OBJECTS AND FEATURES OF THE INVENTION

A primary object and feature of the present invention is to provide a system overcoming the above-mentioned problems and meeting the above-mentioned needs.

It is a further object and feature of the present invention to provide a system to assist a searcher user in finding preferred objects from a collection of objects by indicating preference for some of the objects. A further object and feature of the present invention is to efficiently filter a large collection of objects produced by an initial search or query of a database to arrive at a listing of user-preferred search results. Another object and feature of the present invention is to provide a workable system that approximates the user's value function. Still another object and feature of the present invention is to provide a system that minutely distinguishes among objects in a very refined manner. Yet another object and feature of the present invention is to provide a system that provides a ranked ordering of objects in a collection that did not previously exist that is optimized to the searchers ideal search object.

It is a further object and feature of the present invention to provide such a system comprising a user interface wherein a user may indicate a preference relating to at least one particular object from a collection of objects so that the system may rank the collection of objects based on the searcher's indicated preferences.

Still a further object and feature of the present invention is to provide a system wherein a searcher may examine and evaluate a small subset of objects from a large collection of objects with confidence that the results have high value, i.e. relevant to the searcher for the searchers instant purpose(s).

A further object and feature of the present invention is to provide a system that returns user preferred results by evaluating characteristics of objects at the object level.

A further primary object and feature of the present invention is to provide such a system that is generally easy to use, efficient, and handy. Other objects and features of this invention will become apparent with reference to the following descriptions.

SUMMARY OF THE INVENTION

In accordance with a preferred embodiment hereof, this invention provides a method, relating to refining at least one search by at least one searcher, relating to finding relevant such at least one searcher's relevant objects, comprising the step(s) of: presenting to such at least one searcher at least one large collection of objects comprising at least one set of object characteristics, each such object comprising at least one subset of such at least one set of object characteristics; gathering searcher overall evaluating relating to each single object of at least one sample subset of such at least one large collection of objects; wherein such searcher overall evaluating comprises searcher-setting of at least one relevancy-value relating to each object of such at least one sample subset; using such gathered searcher overall evaluating relating to each single object of at least one sample subset of such at least one large collection of objects, identifying at least one searcher evaluation subset of relevancy-ordered characteristics relating to such sampled objects; using such identified at least one searcher evaluation subset of relevancy-ordered characteristics relating to such sampled objects, identifying at least one relevancy order of such at least one large collection of objects; and presenting, to such at least one searcher, at least one first relevancy-ordered hierarchy comprising such at least one large collection of objects. Moreover, it provides such a method wherein such searcher overall evaluating comprises searcher-setting of at least one scalar relevancy-value and/or of at least one comparative relevancy-value relating to each object of such at least one sample subset.

Additionally, it provides such a method further comprising: after such presenting, to such at least one searcher, such at least one relevancy-ordered hierarchy comprising such at least one large collection of objects, repeating the following steps (gathering searcher overall evaluating relating to each single object of at least one sample subset of such at least one large collection of objects; wherein such searcher overall evaluating comprises searcher-setting of at least one relevancy-value relating to each object of such at least one sample subset; using such gathered searcher overall evaluating relating to each single object of at least one sample subset of such at least one large collection of objects, identifying at least one searcher evaluation subset of relevancy-ordered characteristics relating to such sampled objects; using such identified at least one searcher evaluation subset of relevancy-ordered characteristics relating to such sampled objects, identifying at least one relevancy order of such at least one large collection of objects)—hereinafter referred to as repeatable steps; and performing a second presenting to such at least one searcher of at least one second relevancy-ordered hierarchy comprising such at least one large collection of objects. Also, it provides such a method further comprising n repeats of the above-mentioned repeatable steps by: after such performing an nth presenting to such at least one searcher of at least one nth relevancy-ordered hierarchy comprising such at least one large collection of objects, performing an (n+1)th presenting to such at least one searcher of at least one (n+1)th relevancy-ordered hierarchy comprising such at least one large collection of objects.

In addition, it provides such a method wherein such searcher-setting of at least one scalar relevancy-value relating to each object of such at least one sample subset comprises the step(s) of: searcher-assigning of at least one scalar such relevancy value to at least one such single object of such at least one sample subset; wherein such at least one scalar such relevancy value represents at least one measure of relative relevancy value, of such at least one such single object of such at least one sample subset, relative to such searcher's ideal most-relevant object being sought. And, it provides such a method wherein such at least one scalar such relevancy value, relative to such searcher's ideal most-relevant object being sought, comprises a value-scale including negative values. Further, it provides such a method wherein such at least one scalar such relevancy value, relative to such searcher's ideal most-relevant object being sought, comprises at least one choice among at least one natural-language positive expression and at least one natural-language negative expression. Even further, it provides such a method wherein the step of, using such identified at least one searcher evaluation subset of relevancy-ordered characteristics relating to such sampled objects, identifying at least one relevancy order of such at least one large collection of objects, comprises the step(s) of: determining at least one individual relevancy weight value of each at least one object relating to such sampled objects; applying such at least one individual relevancy weight value, of each at least one object relating to such sampled objects, to each such object-included characteristic, thereby setting individual relevancy weight values of each such object-included characteristic; and obtaining at least one overall relevancy weight value relating to each valued object characteristic by combination of each such at least one individual relevancy weight value of each such object-included characteristic. Moreover, it provides such a method wherein the step of identifying at least one relevancy order of such at least one large collection of objects further comprises the step(s) of applying such overall relevancy weight value relating to each valued object characteristic to the object characteristics within each object of such at least one large collection of objects so that, if a selected characteristic occurs at least once in such collection object, such overall relevancy weight value relating to such characteristic becomes an addend in the total relevancy score assigned to such collection of objects. Additionally, it provides such a method wherein the step of obtaining at least one overall relevancy weight value relating to each valued object characteristic by combination of each such at least one individual relevancy weight value of each such object-included characteristic comprises the step of determining at least one overall relevancy weight value of each such valued object characteristic by using both additive and multiplicative weighting. Also, it provides such a method wherein such step of determining at least one overall relevancy weight value of each such valued object characteristic by using both additive and multiplicative weighting comprises: applying the algorithm $$\text{maximize } \varepsilon$$

subject to $$\sum_{i=1}^{M} w_i D_{ki} - \sum_{i=1}^{M} w_i D_{ji} \geq \varepsilon, \forall k \in S_t, j \in S_{t+1}, t = 1, \ldots, T-1$$

$$\sum_{i=1}^{M} w_i D_{ji}^{P_A} - \sum_{i=1}^{M} w_i D_{ji}^{P_B} \geq \varepsilon, j = 1, \ldots, R,$$

$$0 \leq w_i \leq 1, i = 1, \ldots, M$$

$$\varepsilon \geq 0;$$

wherein i represents such valued object characteristic, w represents such at least one overall relevancy weight value, d represents an object described by an array of such valued object characteristics, $\epsilon$ represents the difference between the weighted values of all objects in such at least one large collection of objects, $s_t$ represents the set of objects within a scalar category t, T represents the total number of scalar categories, m represents the total number of such valued object characteristics within such at least one large collection of objects, $P_A$ and $P_B$ indicate a pair of relatively compared objects with $P_A$ indicating the more preferred, and R represents the total number of direct preference statements. In addition, it provides such a method wherein the step of applying algorithm maximize $\epsilon$ is iteratively performed to approximate such searcher value function. And, it provides such a method wherein such searcher-setting of at least one comparative relevancy-value relating to each object of such at least one sample subset comprises the step(s) of: searcher-assigning of at least one comparative such relevancy value to at least two such single objects of such at least one sample subset; wherein such at least one comparative such relevancy value represents at least one measure of relative relevancy value, of such at least one first of such at least two single objects of such at least one sample subset, relative to such at least one second of such at least two single objects. Further, it provides such a method wherein such at least one comparative such relevancy value comprises at least one choice among at least one natural-language expression indicating more-relevancy-than and at least one natural-language expression indicating less-relevancy-than. Even further, it provides such a method wherein each such natural language choice for each object is given a relative numerical scalar value; and each such relative numerical scalar value is given a position in an overall numerical scalar value among objects evaluated. Moreover, it provides such a method wherein the step of presenting to such at least one searcher at least one large collection of objects comprising at least one set of object characteristics, each such object comprising at least one subset of such at least one set of object characteristics, comprises relating to such at least one set of object characteristics, determining kinds of similarities among such at least one large collection of objects; clustering at least some of such at least one large collections of objects by at least some of such kinds of similarities; and presenting multiple resulting clusters of such objects to such at least one searcher; wherein such at least one searcher is enabled to value a potentially larger variety of such objects. Additionally, it provides such a method further comprising, prior to such step of presenting to such at least one searcher at least one large collection of objects comprising at least one set of object characteristics, each such object comprising at least one subset of such at least one set of object characteristics, the steps(s) of: relating to such at least one set of object characteristics, determining kinds of similarities among such at least one large collection of objects; clustering at least some of such at least one large collections of objects by at least some of such kinds of similarities; and presenting multiple resulting clusters of such objects to such at least one searcher; wherein such at least one searcher is enabled to value a potentially larger variety of such objects. Also, it provides such a method wherein the step of determining kinds of similarities among such at least one large collection of objects comprises the steps of: identifying at least one lesser-relevancy subset of such object characteristics having less relevancy in determining relevant similarities among objects within such multiple resulting clusters of such objects; and performing the step of clustering at least some of such at least one large collections of objects by at least some of such kinds of similarities, only with respect to similarities relating to such object characteristics not within such identified at least one lesser-relevancy subset. In addition, it provides such a method: wherein such objects comprise documents and such object characteristics comprise natural-language strings within such documents; and wherein such at least one lesser-relevancy subset of such object characteristics comprise such natural-language strings less relevant to human searching for "topic" similarity. And, it provides such a method further comprising the step of defining at least one set of object characteristics assignable among such large collection of objects; wherein such step of defining at least one set of object characteristics is performed prior to the step of presenting to such at least one searcher at least one large collection of objects comprising at least one set of object characteristics, each such object comprising at least one subset of such at least one set of object characteristics.

In accordance with another preferred embodiment hereof, this invention provides a method, relating to refining at least one document search by at least one searcher, relating to finding relevant such at least one searcher's relevant documents, comprising the step(s) of: presenting to such at least one searcher at least one large collection of documents comprising at least one set of document natural-language strings, each such document comprising at least one subset of such at least one set of document natural-language strings; gathering searcher overall evaluating relating to each single document of at least one sample subset of such at least one large collection of documents; wherein such searcher overall evaluating comprises searcher-setting of at least one scalar relevancy-value and/or of at least one comparative relevancy-value for each document of such at least one sample subset; using such gathered searcher overall evaluating relating to each single document of at least one sample subset of such at least one large collection of documents, identifying at least one searcher evaluation subset of relevancy-ordered document natural-language strings relating to such sampled documents; using such identified at least one searcher evaluation subset of relevancy-ordered document natural-language strings relating to such sampled documents, identifying at least one relevancy order of such at least one large collection of documents; and presenting, to such at least one searcher, at least one relevancy-ordered hierarchy of such at least one large collection of documents. Further, it provides such a method wherein such at least one large collection of documents relates to vehicles. Even further, it provides such a method wherein such at least one large collection of documents relates to romantic interests.

In accordance with another preferred embodiment hereof, this invention provides a computer-implemented method comprising the steps of: gathering preference feedback, relating to at least one object from at least one large collection of objects, from at least one user searcher; approximating a value function of the at least one user searcher based on such gathered preference feedback; and ordering such at least one large collection of objects based on such approximation of the value function of the at least one user searcher. Moreover, it provides such a computer-implemented method wherein the step of approximating a value function of the at least one user searcher comprises iterative application of the algorithm:

$$\text{maximize } \varepsilon,$$

$$\text{subject to}$$

$$\sum_{i=1}^{M} w_i D_{ki} - \sum_{i=1}^{M} w_i D_{ji} \geq \varepsilon, \forall k \in S_t, j \in S_{t+1}, t = 1, \ldots, T-1$$

$$\sum_{i=1}^{M} w_i D_{ji}^{P_A} - \sum_{i=1}^{M} w_i D_{ji}^{P_B} \geq \varepsilon, j = 1, \ldots, R,$$

$$0 \leq w_i \leq 1, i = 1, \ldots, M$$

$$\varepsilon \geq 0;$$

wherein i represents such valued object characteristic, w represents such at least one overall relevancy weight value, d represents an object described by an array of such valued object characteristics, $\epsilon$ represents the difference between the weighted values of all objects in such at least one large collection of objects, $s_t$ represents the set of objects within a scalar category t, T represents the total number of scalar categories, m represents the total number of such valued object characteristics within such at least one large collection of objects, $P_A$ and $P_B$ indicate a pair of relatively compared objects with $P_A$ indicating the more preferred, and R represents the total number of direct preference statements; wherein after such iterative application of such algorithm maximize $\epsilon$, ordering such at least one large collection of objects based on such approximation of the value function of the at least one user searcher may occur.

In accordance with another preferred embodiment hereof, this invention provides a computer system, relating to refining at least one search by at least one searcher, relating to finding relevant such at least one searcher's relevant objects, comprising: at least one presenting computer interface adapted to present to such at least one searcher at least one large collection of objects comprising at least one set of object characteristics, each such object comprising at least one subset of such at least one set of object characteristics; at least one gathering computer interface adapted to gather searcher overall evaluating relating to each single object of at least one sample subset of such at least one large collection of objects; wherein such at least one gathering computer interface searcher overall evaluating comprises at least one gathering computer processor adapted to gather searcher-setting of at least one scalar relevancy-value and/or of at least one comparative relevancy-value relating to each object of such at least one sample subset; at least one characteristic-evaluating computer processor, using such gathered searcher overall evaluating relating to each single object of at least one sample subset of such at least one large collection of objects, adapted to identify at least one searcher evaluation subset of relevancy-ordered characteristics relating to such sampled objects; at least one object-evaluating computer processor, using such identified at least one searcher evaluation subset of relevancy-ordered characteristics relating to such sampled objects, adapted to identify at least one relevancy order of such at least one large collection of objects; and at least one re-presenting computer interface adapted to present, to such at least one searcher, at least one first relevancy-ordered hierarchy comprising such at least one large collection of objects. Additionally, it provides such a computer system further comprising: at least one computer processor structured and arranged to repeat the following steps gathering searcher overall evaluating relating to each single object of at least one sample subset of such at least one large collection of objects; wherein such searcher overall evaluating comprises searcher-setting of at least one relevancy-value relating to each object of such at least one sample subset; using such gathered searcher overall evaluating relating to each single object of at least one sample subset of such at least one large collection of objects, identifying at least one searcher evaluation subset of relevancy-ordered characteristics relating to such sampled objects; using such identified at least one searcher evaluation subset of relevancy-ordered characteristics relating to such sampled objects, identifying at least one relevancy order of such at least one large collection of objects; at least one second re-presenting interface adapted to present, to such at least one searcher, at least one second relevancy-ordered hierarchy comprising such at least one large collection of objects.

In accordance with another preferred embodiment hereof, this invention provides a computer system, relating to refining at least one search by at least one searcher, relating to finding relevant such at least one searcher's relevant objects, comprising: computer means for presenting to such at least one searcher at least one large collection of objects comprising at least one set of object characteristics, each such object comprising at least one subset of such at least one set of object characteristics; computer means for gathering searcher overall evaluating relating to each single object of at least one sample subset of such at least one large collection of objects; wherein such searcher overall evaluating comprises searcher-setting of at least one relevancy-value relating to each object of such at least one sample subset; computer means for using such gathered searcher overall evaluating relating to each single object of at least one sample subset of such at least one large collection of objects, identifying at least one searcher evaluation subset of relevancy-ordered characteristics relating to such sampled objects; computer means for, using such identified at least one searcher evaluation subset of relevancy-ordered characteristics relating to such sampled objects, identifying at least one relevancy order of such at least one large collection of objects; and computer means for presenting, to such at least one searcher, at least one first relevancy-ordered hierarchy comprising such at least one large collection of objects. Also, it provides such a computer system wherein such searcher overall evaluating comprises computer means for searcher-setting of at least one scalar relevancy-value and/or of at least one comparative relevancy-value relating to each object of such at least one sample subset.

In addition, it provides such a computer system further comprising: computer means for, after such presenting, to such at least one searcher, such at least one relevancy-ordered hierarchy comprising such at least one large collection of objects, repeating computer processing of at least the following elements gathering searcher overall evaluating relating to each single object of at least one sample subset of such at least one large collection of objects; wherein such searcher overall evaluating comprises searcher-setting of at least one relevancy-value relating to each object of such at least one sample subset; using such gathered searcher overall evaluating relating to each single object of at least one sample subset of such at least one large collection of objects, identifying at least one searcher evaluation subset of relevancy-ordered characteristics relating to such sampled objects; using such identified at least one searcher evaluation subset of relevancy-ordered characteristics relating to such sampled objects, identifying at least one relevancy order of such at least one large collection of objects)—hereinafter referred to as repeatable elements; and computer means for performing a second presenting to such at least one searcher of at least one second relevancy-ordered hierarchy comprising such at least one large collection of objects.

And, it provides such a computer system, further computer processing n repeats of such above-mentioned repeatable elements, further comprising: computer means for performing an (n+1)th presenting to such at least one searcher of at least one (n+1)th relevancy-ordered hierarchy comprising such at least one large collection of objects, after an nth presenting to such at least one searcher of at least one nth relevancy-ordered hierarchy comprising such at least one large collection of objects. Further, it provides such a computer system wherein such computer means for searcher-setting of at least one scalar relevancy-value relating to each object of such at least one sample subset comprises: computer means for searcher-assigning of at least one scalar such relevancy value to at least one such single object of such at least one sample subset; wherein such at least one scalar such relevancy value represents at least one measure of relative relevancy value, of such at least one such single object of such at least one sample subset, relative to such searcher's ideal most-relevant object being sought. Even further, it provides such a computer system wherein such at least one scalar such relevancy value, relative to such searcher's ideal most-relevant object being sought, comprises a value-scale including negative values. Moreover, it provides such a computer system wherein such at least one scalar such relevancy value, relative to such searcher's ideal most-relevant object being sought, comprises at least one choice among at least one natural-language positive expression and at least one natural-language negative expression.

Additionally, it provides such a computer system wherein the computer means for, using such identified at least one searcher evaluation subset of relevancy-ordered characteristics relating to such sampled objects, identifying at least one relevancy order of such at least one large collection of objects, comprises: computer means for determining at least one individual relevancy weight value of each at least one object relating to such sampled objects; computer means for applying such at least one individual relevancy weight value, of each at least one object relating to such sampled objects, to each such object-included characteristic, thereby setting individual relevancy weight values of each such object-included characteristic; and computer means for obtaining at least one overall relevancy weight value relating to each valued object characteristic by combination of each such at least one individual relevancy weight value of each such object-included characteristic. Also, it provides such a computer system wherein the computer means for identifying at least one relevancy order of such at least one large collection of objects further comprises: computer means for applying such overall relevancy weight value relating to each valued object characteristic to the object characteristics within each object of such at least one large collection of objects so that, if a selected characteristic occurs at least once in such collection object, such overall relevancy weight value relating to such characteristic becomes an addend in the total relevancy score assigned to such collection of objects.

In addition, it provides such a computer system wherein the computer means for obtaining at least one overall relevancy weight value relating to each valued object characteristic by combination of each such at least one individual relevancy weight value of each such object-included characteristic comprises: computer means for determining at least one overall relevancy weight value of each such valued object characteristic by using both additive and multiplicative weighting. And, it provides such a computer system wherein such computer means for determining at least one overall relevancy weight value of each such valued object characteristic by using both additive and multiplicative weighting comprises computer means for applying the algorithm $$\text{maximize } \varepsilon,$$
$$\text{subject to}$$
$$\sum_{i=1}^{M} w_i D_{ki} - \sum_{i=1}^{M} w_i D_{ji} \geq \varepsilon, \forall k \in S_t, j \in S_{t+1}, t = 1, \ldots, T-1$$
$$\sum_{i=1}^{M} w_i D_{ji}^{P_A} - \sum_{i=1}^{M} w_i D_{ji}^{P_B} \geq \varepsilon, j = 1, \ldots, R,$$
$$0 \leq w_i \leq 1, i = 1, \ldots, M$$
$$\varepsilon \geq 0;$$

wherein i represents such valued object characteristic, w represents such at least one overall relevancy weight value, d represents an object described by an array of such valued object characteristics, $\varepsilon$ represents the difference between the weighted values of all objects in such at least one large collection of objects, $s_t$ represents the set of objects within a scalar category t, T represents the total number of scalar categories, m represents the total number of such valued object characteristics within such at least one large collection of objects, $P_A$ and $P_B$ indicate a pair of relatively compared objects with $P_A$ indicating the more preferred, and R represents the total number of direct preference statements. Further, it provides such a computer system comprising computer means for iteratively applying algorithm maximize $\varepsilon$ to approximate a value function of such searcher. Even further, it provides such a computer system wherein such computer means for searcher-setting of at least one comparative relevancy-value relating to each object of such at least one sample subset comprises: computer means for searcher-assigning of at least one comparative such relevancy value to at least two such single objects of such at least one sample subset; wherein such at least one comparative such relevancy value represents at least one measure of relative relevancy value, of such at least one first of such at least two single objects of such at least one sample subset, relative to such at least one second of such at least two single objects.

Moreover, it provides such a computer system wherein such at least one comparative such relevancy value comprises at least one choice among at least one natural-language expression indicating more-relevancy-than and at least one natural-language expression indicating less-relevancy-than. Additionally, it provides such a computer system wherein each such natural language choice for each object is given a relative numerical scalar value; and each such relative numerical scalar value is given a position in an overall numerical scalar value among objects evaluated. Also, it provides such a computer system wherein the computer means for presenting to such at least one searcher at least one large collection of objects comprising at least one set of object characteristics, each such object comprising at least one subset of such at least one set of object characteristics, comprises computer means for, relating to such at least one set of object characteristics, determining kinds of similarities among such at least one large collection of objects; computer means for clustering at least some of such at least one large collections of objects by at least some of such kinds of similarities; and computer means for presenting multiple resulting clusters of such objects to such at least one searcher; wherein such at least one searcher is enabled to value a potentially larger variety of such objects.

In addition, it provides such a computer system further comprising, prior to operation of such computer means for presenting to such at least one searcher at least one large collection of objects comprising at least one set of object characteristics, each such object comprising at least one subset of such at least one set of object characteristics: computer means for, relating to such at least one set of object characteristics, determining kinds of similarities among such at least one large collection of objects; computer means for clustering at least some of such at least one large collections of objects by at least some of such kinds of similarities; and computer means for presenting multiple resulting clusters of such objects to such at least one searcher; wherein such at least one searcher is enabled to value a potentially larger variety of such objects. And, it provides such a computer system wherein such computer means for determining kinds of similarities among such at least one large collection of objects comprises: computer means for identifying at least one lesser-relevancy subset of such object characteristics shaving less relevancy in determining relevant similarities among objects within such multiple resulting clusters of such objects; and computer means for performing the step, of clustering at least some of such at least one large collections of objects by at least some of such kinds of similarities, only with respect to similarities relating to such object characteristics not within such identified at least one lesser-relevancy subset.

Further, it provides such a computer system: wherein such objects comprise documents and such object characteristics comprise natural-language strings within such documents; and wherein such at least one lesser-relevancy subset of such object characteristics comprise such natural-language strings less relevant to human searching for "topic" similarity.

In accordance with another preferred embodiment hereof, this invention provides a computer system, relating to refining at least one document search by at least one searcher, relating to finding relevant such at least one searcher's relevant documents, comprising: computer means for presenting to such at least one searcher at least one large collection of documents comprising at least one set of document natural-language strings, each such document comprising at least one subset of such at least one set of document natural-language strings;

computer means for gathering searcher overall evaluating relating to each single document of at least one sample subset of such at least one large collection of documents; wherein such searcher overall evaluating comprises searcher-setting of at least one scalar relevancy-value and/or of at least one comparative relevancy-value for each document of such at least one sample subset; computer means for, using such gathered searcher overall evaluating relating to each single document of at least one sample subset of such at least one large collection of documents, identifying at least one searcher evaluation subset of relevancy-ordered document natural-language strings relating to such sampled documents; computer means for, using such identified at least one searcher evaluation subset of relevancy-ordered document natural-language strings relating to such sampled documents, identifying at least one relevancy order of such at least one large collection of documents; and computer means for presenting, to such at least one searcher, at least one relevancy-ordered hierarchy of such at least one large collection of documents.

In accordance with another preferred embodiment hereof, this invention provides a method, relating to refining at least one search by at least one searcher, relating to finding relevant such at least one searcher's relevant objects, comprising the step(s) of: presenting to such at least one searcher at least one large collection of objects comprising at least one set of object characteristics, each such object comprising at least one subset of such at least one set of object characteristics; gathering searcher overall evaluating relating to each single object of at least one sample subset of such at least one large collection of objects; wherein such searcher overall evaluating comprises searcher-setting of at least one scalar relevancy-value and/or of at least one comparative relevancy-value relating to each object of such at least one sample subset; using such gathered searcher overall evaluating relating to each single object of at least one sample subset of such at least one large collection of objects, identifying at least one searcher evaluation subset of relevancy-ordered characteristics relating to such sampled objects; using such identified at least one searcher evaluation subset of relevancy-ordered characteristics relating to such sampled objects, identifying at least one relevancy order of such at least one large collection of objects; and presenting, to such at least one searcher, at least one first relevancy-ordered hierarchy comprising such at least one large collection of objects.

Lastly, this invention provides each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
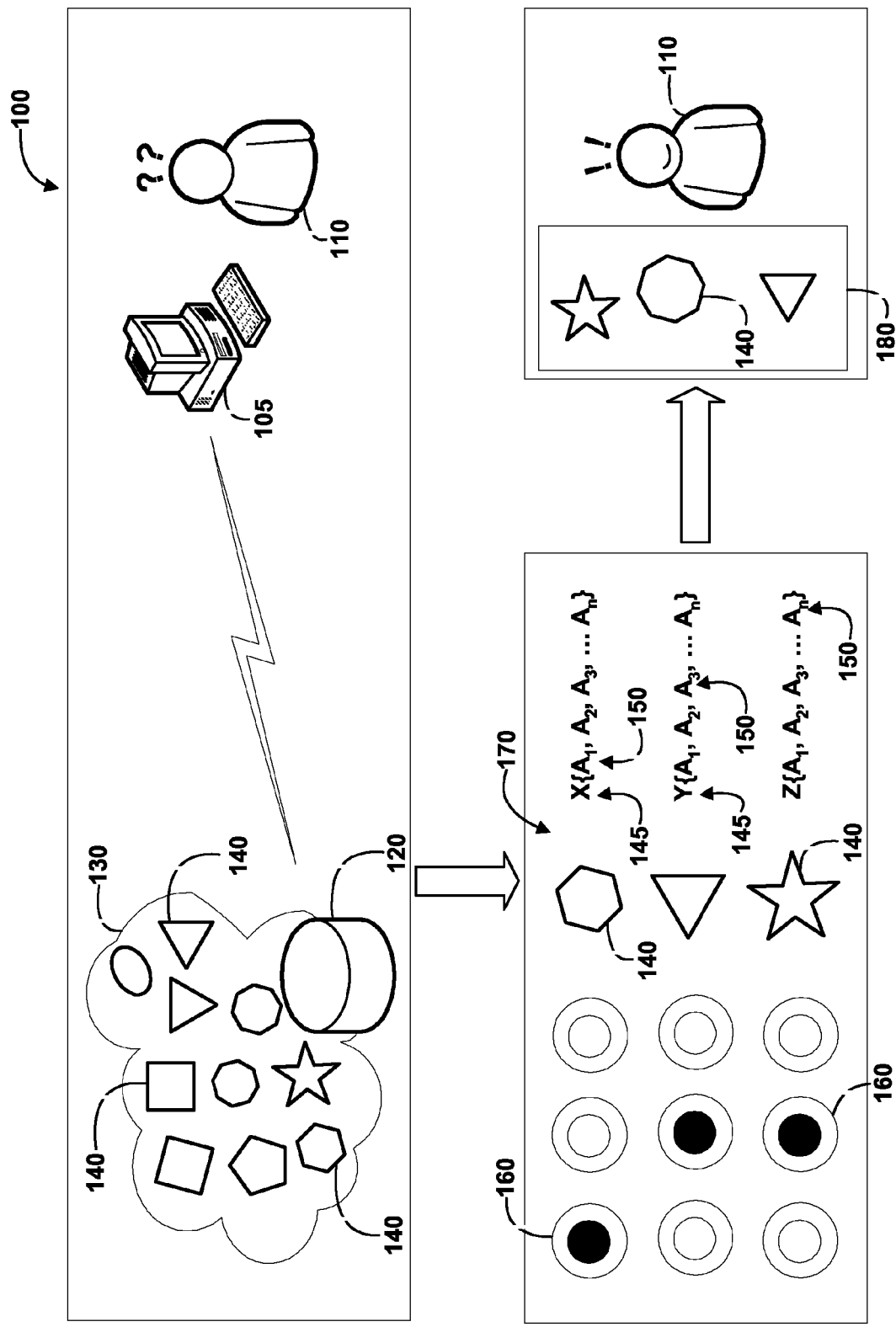
FIG. 1 shows a diagram illustrating a user guided searching system according to a preferred embodiment of the present invention.

FIG. 1 shows a diagram illustrating a user guided searching system according to a preferred embodiment of the present invention. User guided search system 100 preferably aids at least one user 110 to search through a collection 130 preferably comprising at least one object 140, preferably a plurality of objects 140, as shown. Information relating to collection 130 is preferably retrieved preferably from at least one database 120, as shown, preferably by sending at least one search query 525, generated by at least one user 110, via at least one computer 105, as shown. Database 120 preferably comprises at least one information indexing database, preferably at least one search engine database, preferably at least one web search engine database, preferably at least one Google search engine database. Upon reading this specification, those skilled in the art will now appreciate that, under appropriate circumstances, considering such issues as future technology, subject searched, etc., other databases, such as, for example, literary databases, non-Google search engine databases, law library databases, personal profile databases, product listing databases, corporate intranet databases, dating web site databases, retail corporate databases, music databases, image databases, peer-to-peer network databases, real estate databases, etc., may suffice.

Figure 3:
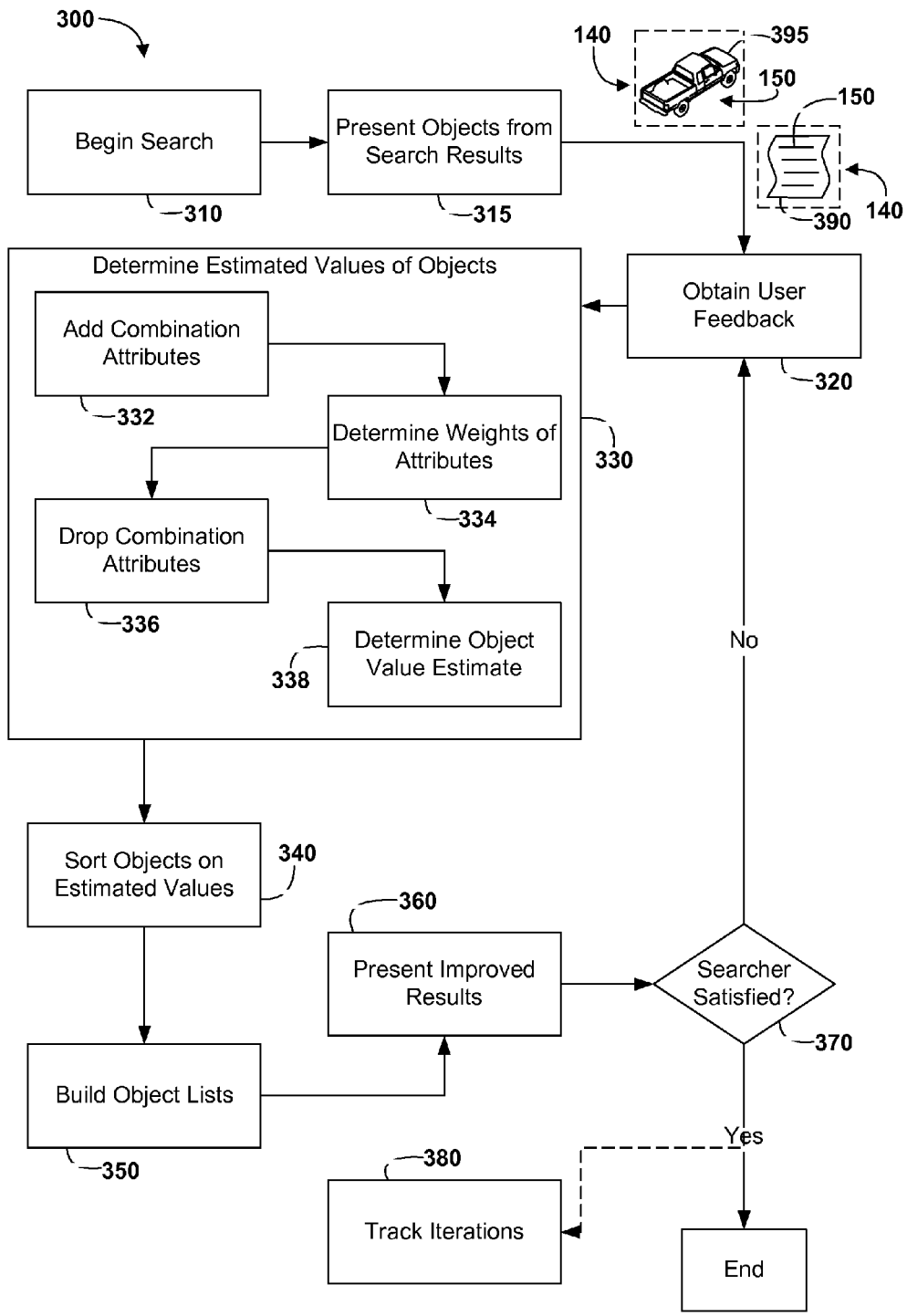
FIG. 3 shows a flow chart diagram illustrating a search refiner process of the user guided searching system of FIG. 1.

Each object 140 preferably comprises a document 390, alternately preferably a vehicle 395 (see FIG. 3). Upon reading this specification, those skilled in the art will now appreciate that, under appropriate circumstances, considering such issues as future technology, database availability, market niche, etc., other objects, such as, for example, books, people, romantic interests, homes, games, movies, pets, images, songs, real estate, etc., may suffice. Object 140 preferably comprises at least one attribute 150, which may preferably be extracted from information retrieved. Attribute 150 preferably may be discretely quantized as being present or absent (1 or 0). Attribute 150 is preferably shared among some of such plurality of objects 140. Attribute 150 is preferably neither unique to one of such plurality of objects 140 nor present in all of such plurality of objects 140. A single attribute array 145 comprises each attribute 150 derived from all of such plurality of objects 140 in collection 130 (at least embodying herein at least one large collection of objects comprising at least one set of object characteristics).

When collection 130 contains a significant number of objects 140, it becomes daunting for user 110 to examine each result retrieved. However, each object 140 may be preferably compared, preferably using attribute array 145, to determine similarities among such plurality of objects 140, as shown. In addition, user 110 may preferably submit an overall evaluation 160 of each object 140 of at least one sampling 170 of such plurality of objects 140, as shown. Preferably using overall evaluation 160 and such determined similarities, at least one subset 180 of such plurality of objects 140, which contains objects 140 with the more highly valued attributes 150, may preferably be identified, thereby reducing the number of objects 140 user 110 need examine to find the most preferred, interesting, or relevant of objects 140. Multiple iterations of submitting an overall evaluation 160 preferably continues to refine which attributes 150, and thereby objects 140, are most highly valued to user 110, as shown.

One may assume attributes of discrete values for objects 140 for at least the following discussed reasons. In a typical keyword-based search for document 390, attribute 150 comprises at least one word 680 (at least embodying herein at least one set of document natural-language strings) which is either present or absent in document 390. Hence, attributes 150 of document 390 are discrete-valued and the presence or absence of word 680 may be represented by binary values 1 and 0, respectively. Therefore the typical keyword-based search for document 390 may be framed as a problem with discrete-valued attributes.

On the surface, this problem appears to be standard in decision analysis. It deals with a discrete set of alternatives (objects 140) defined by a set of attributes 150 with discrete values. However, the attribute-level preference elicitation methods of decision analysis become tedious at best when dealing with a large number of attributes 150, particularly when the number of attributes 150 is in the hundreds. Therefore, user guided search system 100 constructs an approximation of value function, of user 110, for attributes 150 from object-level preference information (overall evaluation 160), obviating the need for attribute-level preference elicitation. A value function is a quantitative measure of a decision maker's preference for an alternative defined by a set of attributes 150. To handle object-level preference information, user guided search system 100 formulates the value function approximation problem as a mathematical programming problem.

Figure 2:
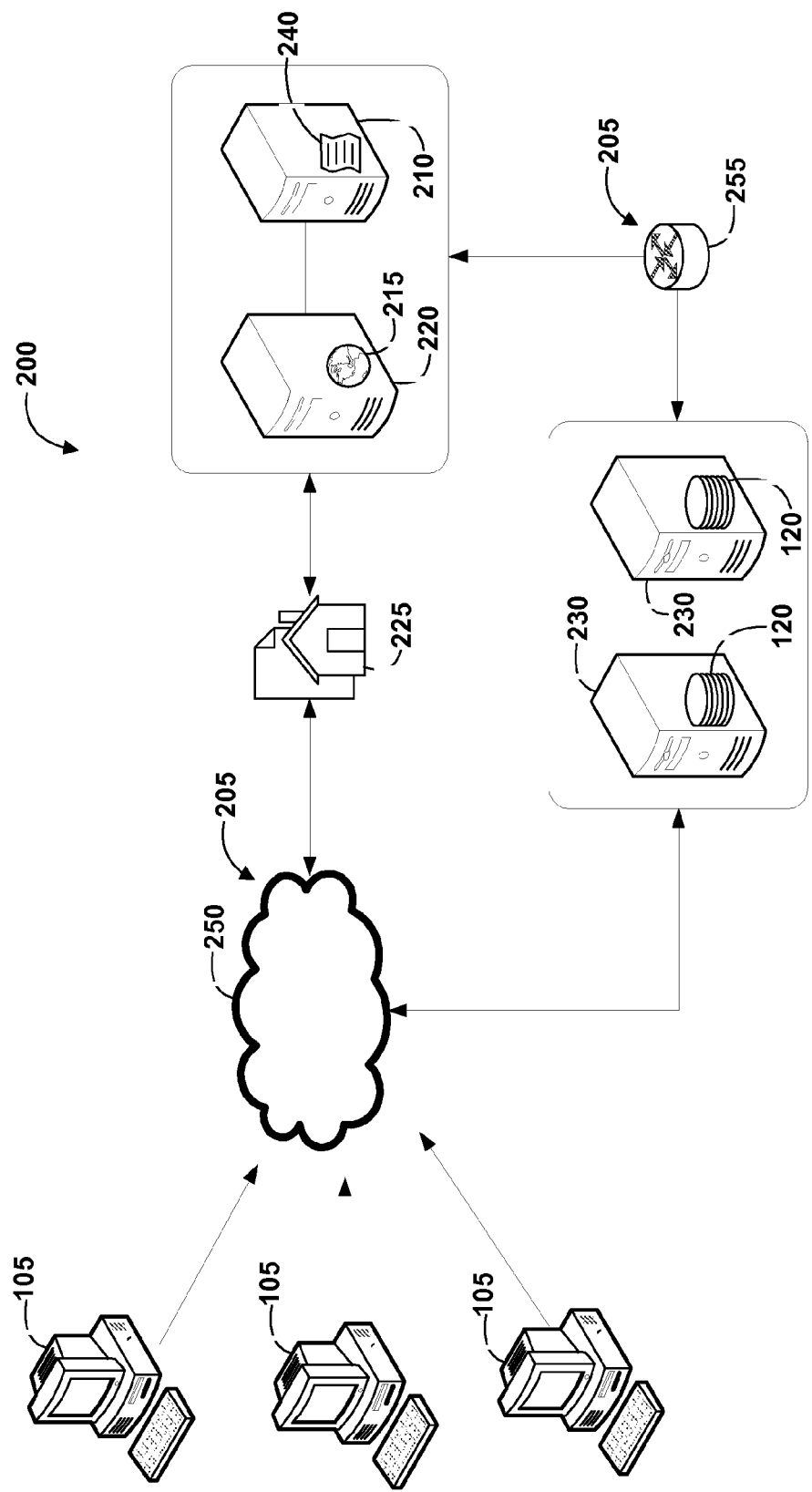
FIG. 2 shows a diagram illustrating communications architecture of the user guided searching system of FIG. 1.

FIG. 2 shows a diagram illustrating communications architecture 200 of the user guided searching system 100 of FIG. 1. Preferably, at least one processing algorithm 240 is hosted on at least one application server 210, as shown. Access to processing algorithm 240 is preferably granted to a least one Web server 220, as shown. Web server 220 preferably hosts at least one web site 215 preferably comprising at least one web page 225, as shown. Web page 225 preferably comprises at least one search dialog screen 500 (see, e.g., FIG. 5). Web server 220 preferably connects to a least one network 205, as shown. Network 205 preferably comprises a least one Wide Area Network ("WAN") 250, preferably the Internet, as shown. Network 205 alternately preferably comprises at least one Local-Area Network ("LAN") 255. Through network 205, Web server 220 preferably connects to a least one database server 230, preferably hosting database 120, as shown, to access information relating to collection 130 (see, e.g., FIG. 1). Upon reading this specification, those skilled in the art will now appreciate that, under appropriate circumstances, considering such issues as future technology, network architecture, etc., other communications architectures, such as, for example, wireless LAN, direct communications, common hosting servers, stand-alone computing devices, company intranet, etc., may suffice.

Computer 105 preferably under direction of user 110, preferably connects to web page 225 to allow user to access user guided search system 100. Upon reading this specification, those skilled in the art will now appreciate that, under appropriate circumstances, considering such issues as future technology, cost, user preference, etc., network accessing user devices other than computers, such as, for example, handheld computing devices, personal media players, iPods, laptops, PDAs, network enabled phones, etc., may suffice.

FIG. 3 shows a flow chart diagram illustrating a search refiner process 300 of user guided search system 100 of FIG. 1. Search refiner process 300 preferably comprises the steps of: begin search 310, present objects from search results 315, obtain user feedback 320, determine estimated values of objects 330, sort objects on estimated values 340, build object lists 350, and present improved results 360, as shown. In search refiner process 300, search results are preferably refined preferably until user 110 is satisfied with top-ranked objects list 770. Upon reading this specification, those skilled in the art will now appreciate that, under appropriate circumstances, considering such issues as user preference, computing workload, etc., other methods of ending iteration cycles, such as for example, ending at a predetermined maximum number of iterations, ending iterations after a predetermined number of evaluations, etc., may suffice.

To begin search refiner process 300, user 110 preferably begins a keyword search, preferably using search query 525 (see, e.g., FIG. 6), in step begin search 310, as shown. Search query 525 is then preferably passed to database 120 to obtain the initial search results, which define collection 130 (at least embodying herein at least one large collection of objects). Database 120 preferably returns the initial search results to application server 210 where each object 140 within search results is preferably pre-processed to determine attribute array 145 and the value of each attribute 150 for each object 140. Some of the initial search results, preferably sampling 170, which are preferably diversely representative of collection 130 (see FIG. 4), are then preferably presented to user 110 on web page 225 in step present objects from search results 315 (at least embodying herein presenting to such at least one searcher at least one large collection of objects comprising at least one set of object characteristics, each such object comprising at least one subset of such at least one set of object characteristics), as shown. In addition to the initial search results, at least one evaluation selector 620 (see, e.g., FIG. 6) is preferably presented, preferably in line with each object 140 of sampling 170.

Figure 6:
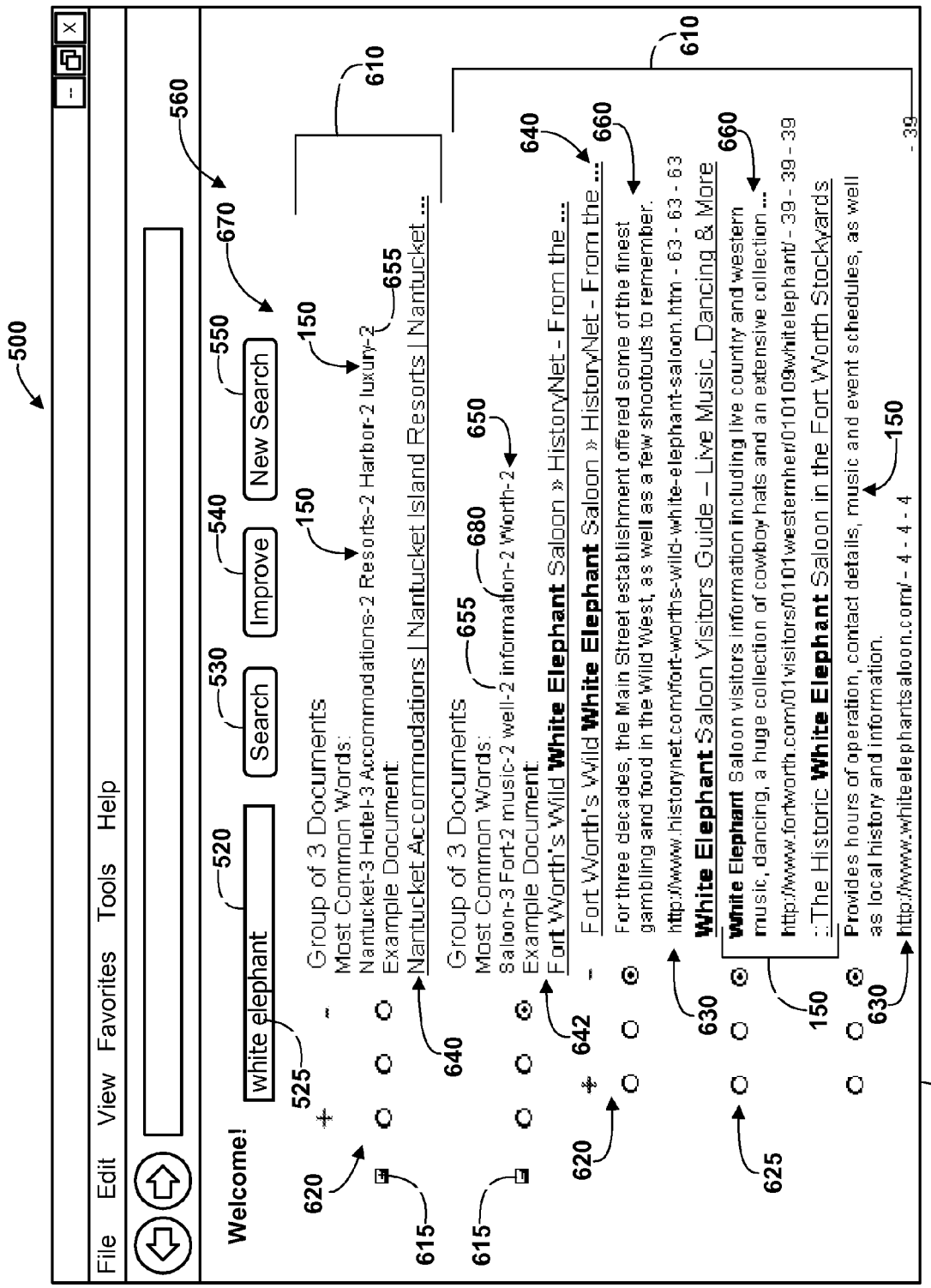
FIG. 6 shows a diagrammatic screenshot, illustrating evaluating an object sampling, of the user guided searching system of FIG. 1.
Figure 7:
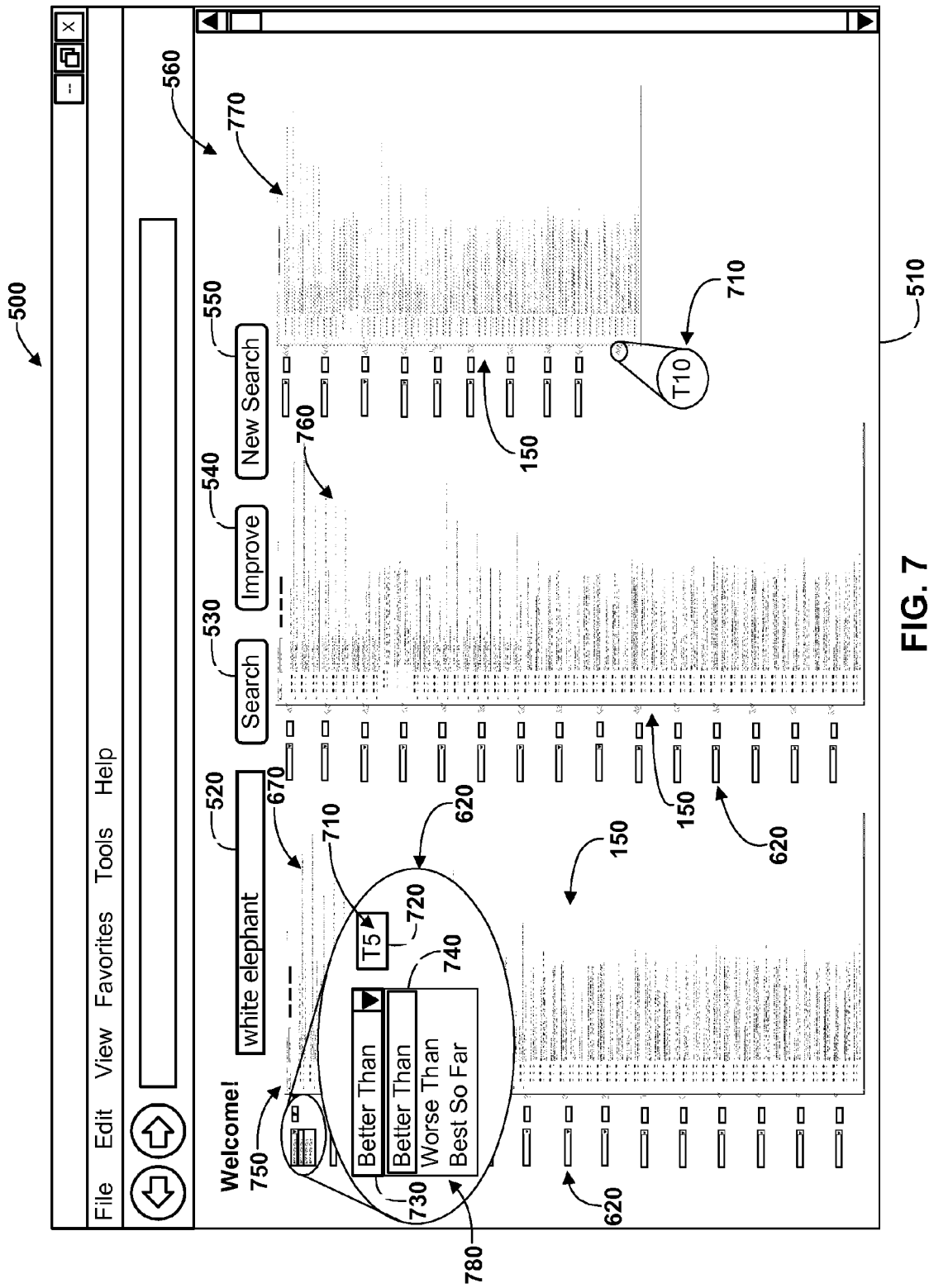
FIG. 7 shows a diagrammatic screenshot, illustrating comparative evaluating of an object sampling, of the user guided searching system of FIG. 1.

In step obtain user feedback 320 (at least embodying herein gathering searcher overall evaluating relating to each single object of at least one sample subset of such at least one large collection of objects), user 110 preferably holistically evaluates, in overall evaluation 160, preferably at least one of objects 140 presented in sampling 170. Overall evaluation 160 preferably comprises at least one independent scalar evaluation 625 (at least embodying herein searcher-assigning of at least one scalar such relevancy value to at least one such single object of such at least one sample subset), as shown in FIG. 6, alternately preferably at lease one relative evaluation 780, as shown in FIG. 7. In addition, overall evaluation 160 may preferably comprise both independent scalar evaluation 625 and relative evaluation 780. This arrangement at least embodies herein wherein such searcher overall evaluating comprises searcher-setting of at least one scalar relevancy-value and/or of at least one comparative relevancy-value relating to each object of such at least one sample subset. After user 110 preferably evaluates preferably a portion of sampling 170, overall evaluation 160 is preferably submitted to improve the ranking of objects 140, as shown.

Upon the submittal of overall evaluation 160, processing algorithm 240 preferably uses preferences of objects 140 stated in overall evaluation 160 to estimate the value of each object 140, in step determine estimated values of objects 330, as shown. Processing algorithm 240 uses mathematical programming to estimate value of objects 140 by examining the relationships of attributes 150 contained in objects 140 which were evaluated. From this estimated value of objects 140 a ranking of objects 140 within collection 130 is optimized to the value function of user 110. Upon reading this specification, those skilled in the art will now appreciate that, under appropriate circumstances, considering such issues as future technology, future methods of decision analysis, etc., other methods using user feedback to optimally rank a collection of objects, such as, for example, weighted Rocchio method, minimum least squares methods, other heuristic methods, combinations of methods, etc., may suffice.

In multi-attribute decision making under certainty, there are broadly two classes of problems. One class primarily deals with problems with many choices and can be represented by continuous variables (e.g., rate, volume of production, or investment amount). A typical mathematical programming problem of Multiple Criteria Decision Making is shown below:

$$\text{Max } V(f(x))$$

$$\text{s.t. } g_k(x)=0, k=1, \ldots, m, l_j \leq x_j \leq u_j, j=1, \ldots, n \quad (1.1)$$

Here x denotes the n-vector of decision variables, $g_k(x)$ the constraints and $f(x)$ the p-vector of criterion or objective functions. The constraints usually define a convex feasible region and the objectives are concave, continuously differentiable functions of the decision variables. $V(f(x))$ represents the implicit value function of the decision maker, and is usually assumed concave in terms of the objective functions.

One class of Multiple Criteria Decision Making methods is built around interactive procedures to identify the most preferred solution. Some methods iteratively present the decision maker with different combinations of feasible objective function values, asks for binary comparisons or to choose the best in a set, and, in the process, attempts to learn more about the decision maker's underlying value function $V(f(x))$. If an additive value function is postulated, the process periodically updates the criterion weights.

In the second class of problems, the choices (commonly expressed in terms of attribute values in decision analysis literature) are usually discrete, limited and finite in number. For this class of problems, mathematical programming models are generally not used. This class of problems falls mainly under Decision Analysis.

Expressions (1.2) and (1.3) below show two value functions widely used: a weighted additive value function and a multiplicative value function, respectively.

$$V(x) = \sum_{i=1}^{n} \lambda_i v_i(x_i) \quad (1.2)$$

$$V(x) = \prod_{i=1}^{n} [1 + kk_i v_i(x_i)] \quad (1.3)$$

Here $\lambda_i$ and $k_i$ are the weights associated with the $i^{th}$ attribute, k is an additional parameter, $v_i(x_i)$ designates a value function over the single attribute $x_i$, and n is the number of attributes. In decision analysis, $v_i(x_i)$ is constructed by questioning the decision maker about preferences for different values of the attribute $x_i$. The weights $\lambda_i$ and $k_i$ are similarly determined by eliciting preference information for different attribute combinations. Once the decision maker's value function $V(x)$ is constructed from the collected preference information (that is, once both the weights $\lambda_i$ and $k_i$ and the single attribute value functions $v_i(x_i)$ are determined), the most preferred alternative is found by evaluating the total set of alternatives using that value function.

User guided search system 100 deals with a problem of the second type, characterized by attributes 150 which are discrete-valued. However, standard decision analysis methods cannot be used because user guided search system 100 preferably asks preference questions at the object level, and not at the attribute level. Thus, user guided search system 100 does not construct attribute level value functions $v_i(x_i)$. Rather, user guided search system 100 preferably constructs the overall value function $V(x)$ preferably directly from object level preference statements. Thus, user guided search system 100 preferably uses mathematical programming techniques normally used in Multiple Criteria Decision Making, and not normally used in Decision Analysis.

Each set of attributes, having discrete multi-values, (a set with multiple discrete values, e.g., a color set that has a set of attribute values such as red, green and blue) is represented by a vector of attributes 150 with single-values where each attribute 150 represents one of the specific values of the multi-values. Hence, a vector of three attributes 150 can represent a color as follows: Color=(Color-Red, Color-Green, Color-Blue). Here, Color-Red, Color-Green, and Color-Blue are the names of three attributes 150 and a vector having values of Color=(1, 0, 0) can represent the color red. Similarly, a vector having values of Color=(0, 1, 0) can represent the color green. In this representation, attribute 150 (e.g. Color-Red) has a value of 1 when the multi-valued attribute has that particular value (i.e., the value of the Color attribute is actually red) and 0 otherwise.

Likewise, to handle continuous value attributes (those with values in a range), a set of attributes 150 may be established by breaking the continuous range into smaller pieces, each represented by one attribute 150. Hence, a vector of five attributes 150 can represent the price of vehicle 395 as follows: Price=(under $10 k, $10 k to $20 k, $20 k to $30 k, $30 k to $40 k, over $40 k). therefore vehicle 395 with a price of $25,999 is represented by: Price=(0, 0, 1, 0, 0) indicating the price lies in attribute 150 representing "$20 k to $30 k".

Beginning with the weighted additive value function in expression (1.2), represent it in terms of a set of attributes 150, with 0-1 values. Let $x_i$, the $i^{th}$ multi-valued attribute, have $P_i$ discrete values given by $a_{iq}$, q=1 to $P_i$. Furthermore, let $v_i(a_{iq})$ be the value of the attribute value function $v_i(x_i)$ when the attribute value is $a_{iq}$ and let $\delta_{iq}$ be a 0-1 variable which has the value of 1 when $x_i = a_{iq}$ and 0 otherwise. Thus, $\delta_{iq}$ is a selector variable that is ON (has a value of 1), when the value of $x_i$ is $a_{iq}$ and is OFF (has a value of 0) otherwise. Although the variable $\delta_{iq}$ can have two different values (0 and 1), it in effect turns on only one of the discrete (nonzero) values of $x_i$. This does not complicate the process from the point of view of user 110, since user 110 deals with holistic alternatives (objects 140). The value function $v_i(x_i)$ can then be represented in terms of these binary valued attribute variables $\delta_{iq}$ as follows:

$$v_i(x_i) = \sum_{q=1}^{P_i} v_i(a_{iq})\delta_{iq} \quad (2.1)$$

$$\sum_{q=1}^{P_i} \delta_{iq} = 1$$

Substituting equation (2.1) into equation (1.2) yields the following expression for the value function $V(x)$ in terms of the single-valued attribute variables $\delta_{iq}$:

$$V(x) = \sum_{i=1}^{n} \lambda_i \sum_{q=1}^{P_i} v_i(a_{iq})\delta_{iq} = \sum_{i=1}^{n}\sum_{q=1}^{P_i} \lambda_i v_i(a_{iq})\delta_{iq} = \sum_{i=1}^{n}\sum_{q=1}^{P_i} w_{iq}\delta_{iq} \quad (2.2)$$

where $w_{iq} = \lambda_i v_i(a_{iq})$. $w_{iq}$ is called the weighted value of the 0-1 attribute variable $\delta_{iq}$ because it is the product of the weight $\lambda_i$ and the value $v_i(a_{iq})$.

In many situations, certain combinations of values of attributes 150 may have a positive or negative impact on the overall value of object 140. For instance, combination of certain words (attributes 150) in a web document (object 140) may have value from perspective of user 110 when searching for relevant documents. Thus, when searching for "Asim Roy" at Arizona State University, all of the three words "Arizona," "State," and "University" appearing in a document make it much more relevant and valuable than a web document that has only one or two of those three words. Similarly, user 110 might have a preference for a black BMW over a black Lexus when they are similar otherwise in terms of price and other features. The multiplicative value function of expression (1.3) is one way to account for these types of interactions between attributes 150. Here is a two-attribute multiplicative value function: $v(x_1, x_2)=k_1 v_1(x_1)+k_2 v_2(x_2)+k_3 v_1(x_1)v_2(x_2)$ where $v_1(x_1)v_2(x_2)$ is the interaction or cross-product term. To represent a multiplicative value function in terms of single-values (0-1 valued) in attributes 150 as in expression (2.2), each cross-product term becomes a separate attribute 150 which is single-valued.

The transformation is done as follows. Let the $j^{th}$ cross-product term be $wc_j$ given by $wc_j=k_j v_r(a_{rp})v_s(a_{sq})v_t(a_{tl})\ldots$. Here $wc_j$ represents the weighted value of the cross-product term. It consists of $L_j$ attributes $x_r$, $x_s$, $x_t$, etc., with values as follows: $x_r=a_{rp}$, $x_s=a_{sq}$, $x_t=a_{tl}$, etc. Here $a_{rp}$ is the $p^{th}$ value of attribute $x_r$, $a_{sq}$ is the $q^{th}$ value of attribute $x_s$, $a_{tl}$ is the $l^{th}$ value of attribute $x_t$, etc. Let $\delta c_j$ be the selector variable for the $j^{th}$ cross-product term $wc_j$. $\delta c_j$ has a value of 1 when $x_r=a_{rp}$, $x_s=a_{sq}$, $x_t=a_{tl}$, etc., and 0 otherwise. Suppose there are Q such cross-product terms in a multiplicative value function and $\delta c_j$ is the selector variable for the $j^{th}$ one, $j=1$ to Q. Then the single-valued attribute representation of an additive value function, expression (2.2), can be extended in a straightforward manner to a multiplicative one as follows:

$$V(x) = \sum_{i=1}^{n}\sum_{q=1}^{P_i} w_{iq}\delta_{iq} + \sum_{j=1}^{Q} wc_j \delta c_j \quad (2.3)$$

When there are thousands of attributes 150, such as in document 390, adding every conceivable cross-product term to expression (2.3) is not practical or efficient, especially when the specific combination of attributes 150 represented by a cross-product term does not occur in any object 140 in collection 130. Therefore, only cross-products of specific combinations of attributes 150 that actually occur in object 140 are preferably considered for inclusion in expression (2.3). As explained below, the cross-product terms that are included in expression (2.3) may preferably be selected using some heuristics so that preferably only the cross-products that have an impact on the value of object 140 are included. Expression (2.3) therefore provides a combined function using both additive and multiplicative value functions (expressions 1.2 & 1.3) which may preferably be restated in terms of attributes 150 with binary values (or single-valued) (this arrangement at least embodying herein wherein the step of obtaining at least one overall relevancy weight value relating to each valued object characteristic by combination of each such at least one individual relevancy weight value of each such object-included characteristic comprises the step of determining at least one overall relevancy weight value of each such valued object characteristic by using both additive and multiplicative weighting).

The notation of expression (2.3) is simplified, before presenting the details of the step of determine estimated values of objects 330, as follows. Suppose each object $D_k$, with $k=1$ to N, in collection 130 is defined by a finite number M of attributes 150 which are single-valued. Let $D_{ki}$, with $i=1$ to M, be the $i^{th}$ single-valued attribute of attributes 150 for the $k^{th}$ object of objects 140. Thus the $k^{th}$ object $D_k$ can be described by the vector (attribute array 145) $D_k=\{D_{k1}, D_{k2}, \ldots D_{km}\}$, where:

S $D_{ki}=1$, if the $i^{th}$ single-valued attribute is present in the $k^{th}$ object; and S $D_{ki}=0$, if the $i^{th}$ single-valued attribute is not present in the $k^{th}$ object.

To illustrate this vector representation consider vehicle 395. Suppose a certain model of vehicle 395 comes in three different colors (red, black, and silver) and in three different prices ($20K, $30K, and $40K) depending on the options. Let the attribute numbers for color and price be 1 and 2 respectively. Therefore $P_1=P_2=3$, the total number of values of each multi-valued attribute. As per the notation above, $a_{11}$=red, $a_{12}$=black, and $a_{13}$=silver. Similarly, $a_{21}$=$20K, $a_{22}$=$30K, and $a_{23}$=$40K. This makes an attribute array 145 of six attributes 150, three for color and three for price, describing each vehicle 395. Accordingly, object 140 ($D_k$) can be defined by the presence or absence of the following attributes 150: red, black, silver, $20K, $30K, and $40K. Attribute array 145 is setup describing object 140. A red vehicle priced at $30K is represented by $D_k=\{1, 0, 0, 0, 1, 0\}$ and a black vehicle priced at $40K is represented by $D_k=\{0, 1, 0, 0, 0, 1\}$. Suppose then two cross-product terms are added to attribute array 145 to examine certain interaction effects, one to get the combined effect of color black and a price of $30k and another to get the combined effect of color red and a price of $40K. Therefore there are now eight attributes 150 to describe vehicle 395: three for color, three for price, one for the attribute combination "black and $30K" and another for the attribute combination "red and $40K". With this expanded version of attribute array 145, a red car priced at $30K now is $D_k=\{1, 0, 0, 0, 1, 0, 0, 0\}$ and a black car priced at $30K now is $D_k=\{0, 1, 0, 0, 1, 0, 1, 0\}$, incorporating the appropriate interaction term. This expanded vector representation shows how cross-product terms can be easily included to account for interaction effects.

In the case of documents 390, each word 680 in each document 390 (at least embodying herein wherein such objects comprise documents and such object characteristics comprise natural-language strings within such documents) preferably comprises attribute 150. The 0-1 values in attribute array 145 for documents 390 ($D_k=\{0, 1, 0, 0, \ldots, 0, 1\}$) preferably indicates the presence or absence of word 680 in document 390 where 1 means word 680 is present and 0 means it is not. The size of attribute array 145 (at least embodying herein each such object comprising at least one subset of such at least one set of object characteristics) may be very large, sometimes in thousands of attributes 150. To reduce the number of attributes 150 considered from document 390, words 680 with no topical significance, usually due to extremely common use, are preferably not used as attributes 150 (this arrangement at least embodying herein wherein such at least one lesser-relevancy subset of such object characteristics comprise such natural-language strings less relevant to human searching for "topic" similarity). Upon reading the specification, those skilled in the art will now appreciate that, under appropriate circumstances, considering such issues as processing speed, total number of attributes, etc., other word reduction methods, such as, for example, stemming, synonym lists, etc., may suffice. Some of words 680 having little significance in determining the value function are listed below in Table I.

TABLE I a
about
after
again
ago
all
almost
also
always
am
an
and
another
any
anybody
anyhow
anyone
anything
anyway
are
as
at
away
back
be
became
because
been
before
being
between
but
by
came
can
cannot
come
could
did
do
does
doing
done
down
each
else
even if
ever
every
everyone
everything
for
from
front
get
getting
go
goes
going
gone
got
gotten
had
has
have
having
he
her
here
him
his
how
I
in
into
is

TABLE I-continued isn't
it
just
last
least
left
less
let
like
make
many
may
maybe
me
mine
more
most
much
my
myself
never
no
none
not
now
of
off
on
one
onto
or
our
ourselves
out
over
per
put
putting
same
saw
see
seen
shall
she
should
so
some
somebody
someone
something
stand
such
sure
take
than
that
the
their
them
then
there
these
they
this
those
through
till
to
too
two
unless
until
up
upon
us
very
was
we
went
were

TABLE I-continued what
whatever
what's
when
where
whether
which
while
who
whoever
whom
whose
why
will
with
within
without
won't
would
wouldn't
yet
you
your Upon reading the specification, those skilled in the art will now appreciate that, under appropriate circumstances, considering such issues as user language, search engine language, etc., other than English languages, such as, for example, German, French, Italian, Spanish, etc., may suffice.

Restating expression (2.3) using this simplified object vector notation that is inclusive of all single-valued attributes produces:

$$V(D_k) = \sum_{i=1}^{M} w_i D_{ki} \qquad (2.4)$$

$V(D_k)$ represents the value of the $k^{th}$ object. Similarly, $w_i$ and $D_{ki}$ correspond to the weighted value and the attribute value (0 or 1) of the $i^{th}$ attribute respectively. $D_{ki}$ essentially indicates whether the $i^{th}$ attribute is present, or not, in the $k^{th}$ object. Note that in this restated form of the value function, the groupings of attributes 150 disappear. Thus, expression (2.4) no longer knows or cares to know which sets of attributes 150 are colors and which ones are prices. This is particularly true of attribute array 145 in documents 390 with thousands of words 680 as attributes 150 with no natural groupings of words 680.

In step determine estimated values of objects 330, processing algorithm 240 preferably determines the weighted values of attributes 150, and preferably thereby estimates the values of objects 140. Step determine estimated values of objects 330 (at least embodying herein using such identified at least one searcher evaluation subset of relevancy-ordered characteristics relating to such sampled objects, identifying at least one relevancy order of such at least one large collection of objects) preferably comprises the steps of: add combination attributes 332, determine weights of attributes 334, drop combination attributes 336, determine object value estimate 338, as shown.

Applicant has tested the capability of user guided search system 100 to capture interaction effects present in multiplicative value functions. In these simulation runs, cross-product terms were created to try to capture the interaction effects in the approximation to the value function. Applicant found that user guided search system 100 actually converged faster to the "most preferred" alternative when capturing the interaction effects. So although a linear approximation to the value function works, the convergence is much faster when the interaction effects are captured in the approximation.

In step add combination attributes 332, as shown, combinations of attributes 150, preferably contained in each object 140, evaluated are preferably identified. Combinations of attributes 150 which are present within multiple objects 140 are preferably considered for addition to attribute array 145. A combination of attributes 150 is preferably only added to attribute array 145 when combination of attributes 150 is preferably contained in more than one object 140 and is preferably not contained in all objects 140 of collection 130. Other than the fact that a combination of attributes 150 contains other attributes 150, combination of attributes 150 is preferably treated as an attribute 150.

Let $T_C$ be the maximum number of new cross-product terms that can be added. Let $S_A(i)$, $i=1$ to $N_C$, be the set of single-valued attributes (terms) that occur in i objects of the top $N_C$ objects in the re-ranked collection. Suppose $N_C=3$ and attributes 150 that appear in all of the top three objects in the re-ranked collection are "$30,000," "black," "power steering," and "power brake." Then the set $S_A(3)=\{$"$30,000," "black," "power steering," "power brake"$\}$. Suppose attributes 150 which are "BMW," "automatic," "sunroof," "leather interior," and "250 hp" appear only in two of the top three of objects 140 in the re-ranked collection. Then $S_A(2)=\{$"BMW," "automatic," "sunroof," "leather interior," "250 hp"$\}$. Let $N_A(i)$ be the number of attributes 150 in the set $S_A(i)$. With each set $S_A(i)$ with $N_A(i)$ attributes 150, $N_A(i)*(N_A(i)-1)/2$ cross-product terms may be created.

User guided search system 100 preferably uses at least one simple heuristic preferably to capture the interaction effects during search. Such at least one heuristic preferably creates cross-products from at least two attributes 150, such as "BMW" and "$30,000," that are active. Attributes 150 are preferably considered active if they actually exist in some of top-ranked objects list 770 in collection 130. Thus, if there are no "black BMWs" in top-ranked objects list 770, then attributes 150 of "BMW" and "black" preferably are not combined to form a cross-product term. Use of only attributes 150 which are active in cross-product terms preferably avoids creating cross-product terms that are non-existent in collection 130 and that do not appear to have significant value to user 110 based on overall evaluation 160.

Next the weight $\lambda_i$ of each attribute 150 is preferably determined, in step determine weights of attributes 334, as shown. In order to estimate the weighted value $w_i$ of each object 140, the weight $\lambda_i$ of each attribute is preferably determined using overall evaluation 160 of each object 140 in sampling 170.

To determine the weight $\lambda_i$ of attributes 150, a hierarchy of preferences is preferably established preferably from Overall evaluations 160. User guided search system 100 preferably allows preference indications in two basic modes: (1) preferably by assignment of objects preferably to predefined preference categories such as high, medium and low preference (independent scalar evaluation 625), and (2) preferably through preference statements, preferably "object A is better than object B", alternately preferably "object A is worse than object B", alternately preferably "object A is the best so far" that directly compares objects 140 (relative evaluation 780) (see discussion of FIGS. 6 and 7).

In general, let there be T preference categories. If high, medium and low are the preference categories, then T is 3. In independent scalar evaluation 625, object 140 is preferably assigned to one of the T preference categories; while in relative evaluation 780, a preference comparison is preferably made with one or more of objects 140. All preference statements from user 110 are preferably collected and preferably stored to be used in step determine weights of attributes 334 preferably to approximate the value function.

Let $S_t$ be the cumulative set of objects 140 in the preference category t, with t=1 to T. Let the T categories be ordered such that the set of objects $S_t$ in category t is preferred to the set of objects $S_{t+1}$ in category t+1.

Let R be the total number of direct preference statements made in relative evaluation 780. Since direct preference statements preferably compare an object A with another object B, let $P_A$ and $P_B$ be the vectors that store the preferred and non-preferred objects, respectively. Objects 140 are preferably stored sequentially in these vectors whenever a direct comparison is made between two objects, the $j^{th}$ object in $P_A$ will be preferred to the $j^{th}$ object in $P_B$, j=1 to R. Let $D_j^{PA}$ be the $j^{th}$ object in $P_A$ and $D_j^{PB}$ be the $j^{th}$ object in $P_B$.

Based on the cumulative preference statements from user 110, the following linear programming (LP) problem may be solved to obtain the weighted values ($w_i$) of attributes 150:

$$\text{Max } \varepsilon$$
Subject to:
$$\sum_{i=1}^{M} w_i D_{ki} - \sum_{i=1}^{M} w_i D_{ji} \geq \varepsilon, \forall k \in S_t, j \in S_{t+1}, t = 1, \ldots, T-1 \quad (2.5)$$

$$\sum_{i=1}^{M} w_i D_{ji}^{P_A} - \sum_{i=1}^{M} w_i D_{ji}^{P_B} \geq \varepsilon, j = 1, \ldots, R,$$

$$0 \leq w_i \leq 1, i = 1, \ldots, M$$
$$\varepsilon \geq 0$$

The first set of constraints for different preference categories simply states that the $k^{th}$ object in the set $S_t$ is preferred to the $j^{th}$ object in the set $S_{t+1}$, so there should be at least some $\varepsilon$ difference in their values. The second set of constraints for direct preference statements simply states that the $j^{th}$ object in the vector $P_A$ is preferred to the $j^{th}$ object in the vector $P_B$, and again, there should be at least some $\varepsilon$ difference in their values (this arrangement at least embodying herein wherein each such natural language choice for each object is given a relative numerical scalar value; and each such relative numerical scalar value is given a position in an overall numerical scalar value among objects evaluated). Upon reading the specification, those skilled in the art will now appreciate that, under appropriate circumstances, considering such issues as processing speed, mathematical constraints, future mathematics, etc., other formulations, such as, for example, exponential functions, polynomial functions, power functions, curvilinear functions, etc., may suffice.

The objective of the LP problem is to maximize this difference $\varepsilon$. The LP problem solves for the weighted values $w_i$, i=1 to M, and $\varepsilon$. If $\varepsilon$ is strictly positive, preference statements of user 110 are consistent with the underlying value function. If $\varepsilon$ is zero (or almost zero), preference statements of user 110 are inconsistent with the underlying value function, which arises due to rounding errors common in computer programs. Theoretically, as long as user 110 gives consistent responses, $\varepsilon$ will remain positive. Preference statements of user 110 are also inconsistent with the underlying value if the LP is infeasible. To deal with inconsistent responses, one may preferably minimize the amount of inconsistencies, alternately preferably systematically drop the older LP constraints (overall evaluations 160) when they are in conflict with the newer ones. For Internet search problems (e.g. Google search), certain words may have negative values. For example, Google allows one to indicate both positive and negative words for a search. Negative values for attributes 150 in the above formulation are preferably allowed for by letting $w_i$ be negative.

In general, there are multiple solutions to an LP when there are few constraints and lots of variables. Therefore as more constraints get added to the LP in the iterative search process, the solution space for the weighted values $w_i$ tightens and a better approximation to the value function is found.

In step drop combination attributes 336, a determination is preferably made about which attributes 150, added in step add combination attributes 332, may be dropped, as shown. An initial estimation of the value of all objects 140 in the collection 130 is preferably determined from the weighted values calculated in step determine weights of attributes 334 (at least embodying herein using such gathered searcher overall evaluating relating to each single object of at least one sample subset of such at least one large collection of objects, identifying at least one searcher evaluation subset of relevancy-ordered characteristics relating to such sampled objects; and at least embodying herein determining at least one individual relevancy weight value of each at least one object relating to such sampled objects). With this initial estimation of the value of object 140, objects 140 ranked near the top, preferably in the top 10, preferably in the top five, are preferably examined for the presence of attributes 150 added in step add combination attributes 332. Any of these attributes 150 not present are preferably considered to be insignificant and preferably are therefore dropped (only attributes 150 derived from cross-product terms are added to or dropped from attribute array 145).

The following heuristic is preferably used to add and drop cross-product terms:

(1) Create the sets $S_A(i)$, i=1 to $N_C$, of single-valued attributes (terms) that occur in exactly i objects of the top NC objects in the re-ranked collection; drop sets $S_A(i)$ with less than two attributes 150;

(2) Set i=$N_C$, count=0;

(3) initialize counters: j=1, k=2;

(4) create a new cross-product term from the $j^{th}$ and $k^{th}$ single-valued attributes (single terms) in the set $S_A(i)$. If this cross-product term already exists, then go to (5). Else, increment count: count=count+1. If count=$T_C$, go to (6); else go to (5).

(5) increment k: k=k+1. If k<=$N_A(i)$, go to step (4); else increment j: j=j+1. If j<$N_A(i)$, set k=j+1 and go to step (4); else decrement i: i=i−1. If i>=1, go to step (3); else go to (6).

(6) Solve the linear programming problem of expression (2.5) with all overall evaluations 160 and the new cross-product terms to get new weighted values $w_i$ for attributes 150 and the cross-product terms.

(7) Drop cross-product terms whose weighted values are less than the maximum of the weighted values of attributes 150 in those cross-product terms.

Upon reading this specification, those skilled in the art will now appreciate that, under appropriate circumstances, considering such issues as processing speed, total number of attributes, etc., other heuristics, such as for example, random selection, database listing of common combinations, other heuristics designed to account for interaction effects in multiplicative value functions, etc., may suffice.

Here's an example of how cross-product terms are dropped in step (7) above. Suppose "black BMW" is the cross-product term and its weighted value in the LP solution is 0.5. In addition, suppose that the weighted values of the single-valued attributes "BMW" and "black" are 0.4 and 0.7 respectively. Since the maximum of the weighted values of "BMW" and "black" is 0.7 and it is greater than the weighted value 0.5 of the cross-product term "black BMW," the cross-product term "black BMW" is dropped. In other words, only cross-product terms that have high value to user 110 are preferably kept. In testing, applicant set $T_C=M/2$, where M is the total number of attributes 150, and $N_C=3$.

After dropping insignificant cross-product terms from attributes 150, weighted values $w_i$ of attributes 150 are preferably re-determined preferably using the remaining attributes 150 in expression (2.5). These weighted values $w_i$ of attributes 150 are preferably then used in step determine object value estimate 338 (at least embodying herein applying such at least one individual relevancy weight value, of each at least one object relating to such sampled objects, to each such object-included characteristic, thereby setting individual relevancy weight values of each such object-included characteristic) preferably to calculate the value of each object 140 in collection 130.

After calculating the value of each object 140 in collection 130, collection 130 is preferably re-ranked in step sort objects on estimated values 340, as shown. This re-ranking preferably allows the building of lists of objects 140 in step build object lists 350.

For top-ranked objects list 770, the top objects 140 are preferably selected from the re-ranked list. Additionally, objects 140 previously un-evaluated are compiled in new list 750. At least one evaluated objects list 760 is preferably generated containing all objects 140 previously-evaluated. These three lists are preferably then presented to user 110 in step present improved results 360, as shown. User 110 may then preferably determine whether top-ranked objects list 770 satisfactorily represents the search target in step determined user satisfaction 370, as shown. Should more refinement be needed, user 110 may preferably provide additional overall evaluations 160, and preferably began a new iteration of search refiner process 300 preferably beginning in step obtain user feedback 320, as shown. This arrangement at least embodies herein after such performing an $n^{th}$ presenting to such at least one searcher of at least one $n^{th}$ relevancy-ordered hierarchy comprising such at least one large collection of objects, performing an $(n+1)^{th}$ presenting to such at least one searcher of at least one $(n+1)^{th}$ relevancy-ordered hierarchy comprising such at least one large collection of objects.

At each iteration of search refiner process 300, user guided search system 100 preferably presents user 110 with sampling 170 preferably comprising some objects 140 not previously viewed then preferably asks user 110 to evaluate these objects through the submission of an overall evaluation 160. Overall evaluation 160 preferably evaluates object 140 in entirety and preferably not particular attributes 150. From accumulation of overall evaluations 160, user guided search system 100 preferably constructs an approximation to the value function of user 110. Once the approximate value function is constructed from accumulation of overall evaluations 160, all objects 140 in collection 130 are preferably re-ranked using this approximate value function and then at least one of the top-ranked of objects 140 is preferably presented to user 110 for evaluation at the next iteration. The interactive search process stops when the user is satisfied with top-ranked objects list 770. Optionally, the number of iterations required to satisfy user 110 may preferably be tracked preferably to aid in the refinement of expression (2.5), in step track iterations 380.

Figure 4:
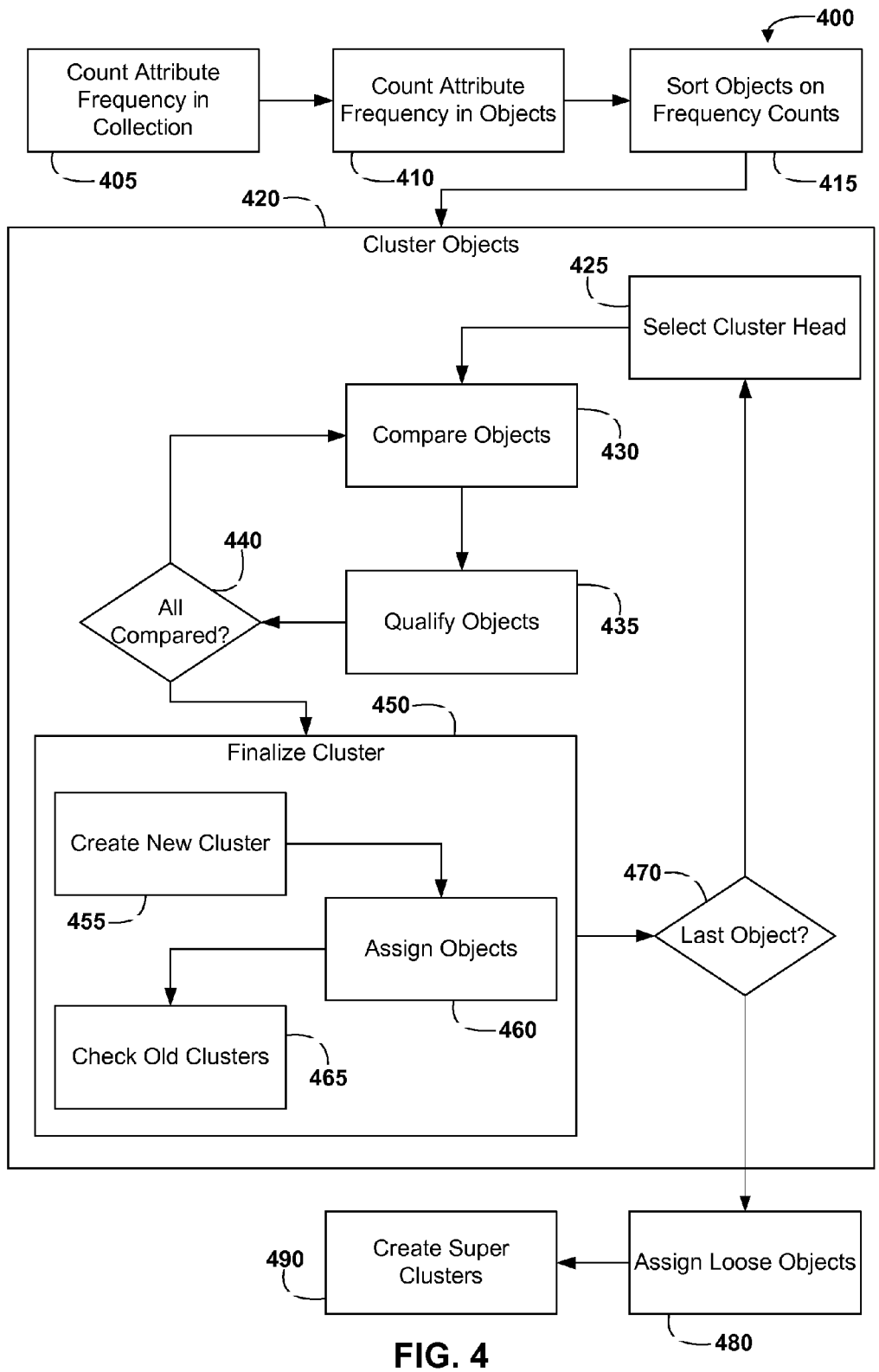
FIG. 4 shows a flow chart diagram illustrating a clustering algorithm flow of the user guided searching system of FIG. 1.

FIG. 4 shows a flow chart diagram illustrating a clustering algorithm flow of the user guided searching system of FIG. 1.

Prior to steps present objects from search results 315 and present improved results 360 (at least embodying herein presenting, to such at least one searcher, at least one first relevancy-ordered hierarchy comprising such at least one large collection of objects), clustering algorithm process 400 preferably groups objects 140 according to similarities in attributes 150 into at least one cluster 610. Using clusters 610 in presenting objects 140 to user 110 preferably presents a wider variety of objects 140 for evaluation, increasing the effectiveness of expression (2.5) (this arrangement at least embodying herein presenting multiple resulting clusters of such objects to such at least one searcher; and this arrangement at least embodying herein wherein such at least one searcher is enabled to value a potentially larger variety of such objects).

To begin, the occurrence frequency of each attribute 150 within collection 130 is preferably counted in step count attribute frequency in collection 405 (at least embodying herein relating to such at least one set of object characteristics, determining kinds of similarities among such at least one large collection of objects). Attributes 150 exhibiting frequency counts above a preferred minimum count, preferably three, are preferably used for clustering. Like in processing documents 390 discussed in FIG. 3, attributes 150 used for clustering preferably do not contain insignificant words like those shown in Table A above (this arrangement at least embodying herein identifying at least one lesser-relevancy subset of such object characteristics having less relevancy in determining relevant similarities among objects within such multiple resulting clusters of such objects). Additionally, a count of the occurrence frequency of each attribute 150 in each object 140 is preferably taken in step count attribute frequency in objects 410. With these frequency counts, objects 140 in collection 130 are preferably sorted from highest count to lowest count in step sort objects on frequency counts 415.

Step cluster objects 420 (at least embodying herein clustering at least some of such at least one large collections of objects by at least some of such kinds of similarities; and at least embodying herein performing the step, of clustering at least some of such at least one large collections of objects by at least some of such kinds of similarities, only with respect to similarities relating to such object characteristics not within such identified at least one lesser-relevancy subset) preferably uses the sort order created in step sort objects on frequency counts 415 to begin clustering objects 140. Step cluster objects 420 preferably begins in step select cluster head 425. In step select cluster head, beginning with object 140 with the highest frequency count of attributes 150, object 140 is preferably selected as a cluster head 642.

Once selected, cluster head 642 is preferably compared to each other object 140 in collection 130, in step compare objects 430. A similarity score is preferably determined for each comparison by counting attributes 150 which appear in both compared objects 140. A higher similarity score results from more attributes 150 held in common, while lower similarity score results from fewer attributes 150 held in common.

After a similarity score has been determined, each object 140 is preferably qualified for inclusion in a new cluster with cluster head 642, in step qualify objects 435. Object 140 preferably qualifies to be assigned to the new cluster with cluster head 642 when similarity score exceeds a minimum similarity score, preferably three. If the object 140 is already in another cluster 610, to be qualified, similarity score with cluster head 642 of this new cluster must be greater than the similarity score with cluster head 642 of its current cluster 610. Comparison and qualification of objects 140 for inclusion in the new cluster with cluster head 642 continues until preferably all objects 140 in collection 130 have been compared as indicated by comparison check 440.

Once finished with comparison and qualification, step finalize cluster 450 preferably validates the new cluster for creation and preferably finalizes that creation. The new cluster is preferably validated when the number of objects 140 contained in the new cluster IS preferably greater than the minimum allowed objects per cluster, preferably three.

Once validated the new cluster is preferably created in step create new cluster 455. Objects 140 which have been qualified are then preferably assigned in step assign objects 460. As objects 140 are assigned any objects 140 which had been previously assigned to a different cluster 610 invoke the step check old clusters 465. In step check old clusters 465, clusters 610 preferably having objects 140 removed are preferably revalidated. Any cluster 610 falling below the minimum allowed objects per cluster 610, due to the removal of object 140 being placed in the new cluster, are preferably deleted.

Step cluster objects 420 preferably continues with step select cluster head 425 preferably until every object 140 is preferably selected as cluster head 642, as indicated in last object check 470. Step select cluster head 425 preferably selects each object 140 as cluster head 642 progressively down from object 140 containing the highest frequency count of attributes 150 to object 140 containing the lowest frequency count.

Once all objects 140 are tried as cluster heads 642, any object 140 not assigned to one cluster 610 is preferably assigned to an existing cluster 610 with which it has the highest similarity score, in step assign loose objects 480. This operation preferably assures that objects 140 knocked out of cluster 610 due to the deletion of cluster 610 are preferably reassigned to one of the final clusters 610.

Once all the clusters 610 are made, the creation of super-clusters preferably begins in step create super-clusters 490. Super-clusters are preferably created using step cluster objects 420 where super-clusters are preferably treated as clusters and clusters 610 are preferably treated as objects. When comparing clusters 610, to create super-clusters, preferably cluster heads 642 are preferably compared for similarities.

Upon reading the specification, those skilled in the art will now appreciate that, under appropriate circumstances, considering such issues as processing speed, size of clusters desired, etc., other clustering methods, such as, for example, common web site clustering, topical clustering, meta data clustering, etc., may suffice.

Figure 5:
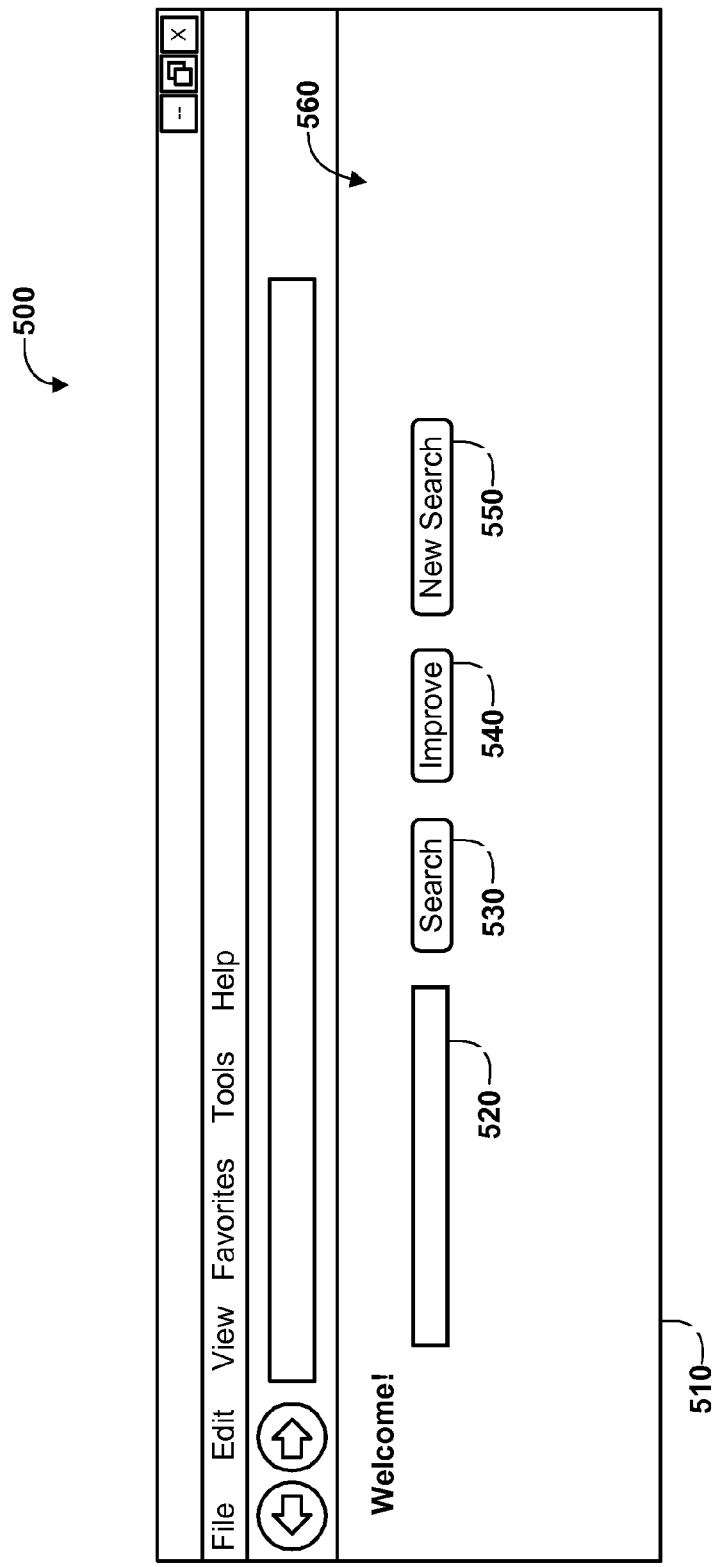
FIG. 5 shows a diagrammatic screenshot, illustrating a search dialog screen, of the user guided searching system of FIG. 1.

FIG. 5 shows a diagrammatic screenshot, illustrating a search dialog screen 500, of the user guided searching system of FIG. 1. In operation, to begin a search, user 110 preferably inputs a Uniform Resource Locator ("URL") into Internet web browser program 510 (such as Microsoft® Internet Explorer or Mozilla™ Firefox). User 110 is then preferably directed to a web page associated with the input URL.

As shown in FIG. 5, web page 560 preferably comprises search dialog screen 500. Search dialog screen 500 preferably comprises at least the following elements: search textbox 520, search button 530, improve button 540, and new search button 550. Preferably, improve button 540 and new search button 550 are not active prior to performing a first search, but preferably become "active" after a first search by user 110 is performed.

User 110 preferably inputs preferred text to be searched into search textbox 520 and subsequently preferably clicks search button 530 (preferably with a computer input devices, preferably a computer mouse). The input text will preferably relate to what user 110 wishes to search. After clicking search button 530, web server 130 will return a results screen described in FIG. 6.

FIG. 6 shows a diagrammatic screenshot, illustrating evaluating an object sampling, of the user guided searching system of FIG. 1.

FIG. 6 shows the results of search query 525 (the text "white elephant") input into search textbox 520 of search dialog screen 500. As in FIG. 5, search dialog screen 500 preferably comprises search textbox 520, search button 530, improve button 540, and new search button 550. Since a first search has been performed, improve button 540 and new search button 550 preferably are "active" or clickable.

The search results, preferably object sampling 670, for search query 525 are preferably displayed below search textbox 520, search button 530, improve button 540, and new search button 550, as shown. Object sampling 670 is preferably a list of objects 140, as shown, preferably a listing of documents 390, as shown. Each document 390 comprises attributes 150, preferably words 680, as shown.

For ease of user evaluation, such listing of documents is preferably arranged in clusters 610, as shown. With reference to the discussion of FIG. 4, clusters 610 are groupings of objects 140 comprising similar attributes 150. Clusters 610 preferably assist a user in evaluating a large variety of sampling of objects by grouping similar objects.

Expand/collapse button 615 is preferably available to expand or collapse objects grouped within a particular cluster 610, as shown. The expand and collapse functions of expand/collapse button 615 are preferably triggered by a user, preferably with a computer input device.

Within a particular cluster 610, the following are preferably displayed to a user:
a listing of attributes 150, preferably words 680;
a numerical indicator of the number of times a particular word 680 is displayed within a document or cluster 610, preferably displayed as attribute value 655;
an example object in a particular cluster 610, preferably displayed as document hyperlink 640 (to assist user-viewing of the entire object);
sampled text from a particular object, preferably displayed as brief description 660;
document URL 630, preferably clickable, associated with a particular object;

To find user-preferred documents within the large collection of objects 140, a user preferably scans object sampling 670 for user-preferred documents, attributes, words, etc. The user may view attributes 150, clusters 610, listing of attributes 650, document hyperlink 640, document URL 630, brief description 660, words 680, attribute value 655, etc. Preferably using evaluation selector 620, a user preferably indicates which documents 390 user 110 prefers. As shown in FIG. 6, evaluation selectors 620 are preferably available for use at the level of cluster 610 and at the level of document within cluster 610 (if "fine tuning" of preference searching within a cluster is desired or needed by a user).

Evaluation selectors 620 preferably comprise at least two clickable radio buttons, preferably at least three radio buttons, which may be selected by user 110. The radio buttons are independent scalar evaluation 625. Preferably, each radio button has a value associated with the radio button that user 110 may select. For present purposes, and as shown in FIG. 6, a (+), ( ), and a (−) are shown, representative of "Relevant", "Partially Relevant", and "Not Relevant" respectively (this arrangement at least embodying herein wherein such at least one scalar such relevancy value, relative to such searcher's ideal most-relevant object being sought, comprises a value-scale including negative values). Preferably, the colors (green), (yellow), (red) are preferably used for each independent scalar evaluation 625 (at least embodying herein wherein such searcher overall evaluating comprises searcher-setting of at least one relevancy-value relating to each object of such at least one sample subset; and this arrangement at least embodying herein wherein such at least one scalar such relevancy value, relative to such searcher's ideal most-relevant object being sought, comprises at least one choice among at least one natural-language positive expression and at least one natural-language negative expression) of evaluation selectors 620. When rating object 140 with independent scalar evaluation 625, user 110 is comparing object 140 to an ideal, which may or may not be present in collection 130, held in the mind of user 110. Such ideal represents to user 110 the most relevant object possible to the search (this arrangement at least embodying herein wherein such at least one scalar such relevancy value represents at least one measure of relative relevancy value, of such at least one such single object of such at least one sample subset, relative to such searcher's ideal most-relevant object being sought).

If user 110 prefers a particular cluster 610 or document 390, user 110 preferably indicates so preferably by selecting the radio button of evaluation selector 620 associated with the (+). If user 110 does not prefer a particular cluster 610 or document 390, user 110 preferably indicates so preferably by selecting the radio button of evaluation selector 620 associated with the (−). If user 110 moderately prefers a particular cluster or document 390, user 110 preferably indicates so preferably by selecting the radio button of evaluation selector 620 associated with the ( ). Also, user 110 may preferably make no preference indication with respect to document 390 or particular cluster 610. Upon reading the teachings of this specification, those of ordinary skill in the art will now understand that, under appropriate circumstances, considering such issues as evaluation parameters, search types, etc., valuing non-use of an evaluation indicator may suffice. This arrangement at least embodies herein wherein such at least one scalar such relevancy value, relative to such searcher's ideal most-relevant object being sought, comprises at least one choice among at least one natural-language positive expression and at least one natural-language negative expression.

Even when only evaluating objects 140 negatively, user 110 preferably still receives objects 140, which are potentially more relevant. This is because the use of heuristics, allowing negative values, pushes those objects 140, so negatively evaluated, to the bottom of the ranking, allowing other objects 140 to rise to the top.

After user 110 has made some preference indications using evaluation selectors 620, the user preferably clicks the improve button 540. With reference to the discussion of FIG. 3, search refiner process 300 will preferably value the selections made by user 110 and in turn present a new object sampling 670. User 110 may be satisfied with the newly presented object sampling in which case, user 110 has found the most user-preferred of objects 140. If user 110 is not satisfied with new object sampling 670, user 110 may preferably make more preference selections preferably using evaluation selectors 620 of new object sampling 670 and preferably click improve button 540. User 110 will preferably stop improving a search when, preferably, user 110 is satisfied.

If a user wishes to start a new search, a user preferably clicks new search button 550. Upon clicking new search button 550, the user will preferably be redirected to a "blank" search screen like the screen shown in FIG. 5.

FIG. 7 shows a diagrammatic screenshot, illustrating comparative evaluating of an object sampling, of the user guided searching system of FIG. 1.

As in FIG. 6, the screenshot in FIG. 7 is intended to obtain user feedback. As in FIG. 5, the screenshot in FIG. 7 is search dialog screen 500, and preferably comprises search textbox 520, search button 530, improve button 540, and new search button 550. Since a first search has been performed, improve button 540 and new search button 550 are "active" or clickable. Shown in FIG. 7 are three preferred lists, new list 750, evaluated objects list 760, and top-ranked objects list 770. Three lists are shown on one screen (note that the text size in FIG. 7 has been intentionally reduced to illustrate the ability of a user to indicate a preference).

Preferably, next to each document 390 (or object 140 from collection 130) is evaluation selector 620 comprising relative evaluation 780, as shown. Using relative evaluation 780, user 110 may indicate a preference type. Preferably, pull down box 730 is preferably selected by user 110 so that user 110 may select a preference type, as shown. Preferably, user 110 may select in drop-down list 740 among, as shown, "better than" a particular document, "worse than" a particular document, and "best so far" (this arrangement at least embodying herein wherein such at least one comparative such relevancy value comprises at least one choice among at least one natural-language expression indicating more-relevancy-than and at least one natural-language expression indicating less-relevancy-than). Preferably, document identifier box 720 is preferably positioned near pull down box 730 so that user 110 may indicate which document user 110 is comparing using document indicator 710 (e.g., T5). This arrangement at least embodies herein searcher-assigning of at least one comparative such relevancy value to at least two such single objects of such at least one sample subset. Upon reading this specification, those skilled in the art will now appreciate that, under appropriate circumstances, considering such issues as cost, screen design, search type, etc., other relative evaluations, such as, for example, order lists, best out of three, other one-to-one comparisons, other one-to-many comparisons, many-to-many comparisons, etc., may suffice.

Although applicant has described applicant's preferred embodiments of this invention, it will be understood that the broadest scope of this invention includes modifications such as other heuristics and other mathematical steps. Such scope is limited only by the below claims as read in connection with the above specification. Further, many other advantages of applicant's invention will be apparent to those skilled in the art from the above descriptions and the below claims.

What is claimed is:

1. A method, implemented by a computer system, relating to refining at least one search during at least one individual search session by at least one user searcher, relating to finding objects relevant to the at least one search of the at least one user searcher, comprising the steps of:
   a) presenting to the at least one user searcher at least one large collection of objects comprising at least one set of object characteristics during the at least one individual search session, each object comprising at least one subset of the at least one set of object characteristics;
   b) wherein the large collection of objects results from one search query of the at least one user searcher;
   c) gathering searcher overall evaluating relating to each single object of at least one sample subset of the at least one large collection of objects during the at least one individual search session;
   d) wherein the searcher overall evaluating comprises searcher-setting of at least one relevancy-value relating to each object of the at least one sample subset during the at least one individual search session;

e) using the gathered searcher overall evaluating relating to each single object of the at least one sample subset of the at least one large collection of objects, identifying at least one user searcher evaluation subset of relevancy-ordered characteristics relating to the sampled objects during the at least one individual search session;

f) using the identified at least one user searcher evaluation subset of relevancy-ordered characteristics relating to the sampled objects, identifying at least one relevancy order, approximating a preference function of the at least one user searcher, of the at least one large collection of objects resulting from the one search query, wherein the approximating the value function of the at least one user searcher comprises iterative application of the algorithm to maximize $\epsilon$ subject to:

$$\sum_{i=1}^{M} w_i D_{ki} - \sum_{i=1}^{M} w_i D_{ji} \geq \varepsilon, \forall k \in S_t, j \in S_{t+1}, t = 1, \ldots, T-1$$

$$\sum_{i=1}^{M} w_i D_{ji}^{P_A} - \sum_{i=1}^{M} w_i D_{ji}^{P_B} \geq \varepsilon, j = 1, \ldots, R,$$

$$0 \leq w_i \leq 1, i = 1, \ldots, M$$

$$\varepsilon \geq 0$$

wherein
  i) i represents the valued object characteristic,
  ii) w represents the at least one overall relevancy weight value,
  iii) D represents an object described by an array of the valued object characteristics, and wherein D is at least one of additive form or multiplicative form, or any combination thereof,
  iv) $\epsilon$ represents the difference between the weighted values of all objects in the at least one large collection of objects,
  v) $S_t$ represents the set of objects within a scalar category t,
  vi) T represents the total number of scalar categories,
  vii) M represents the total number of the valued object characteristics within the at least one large collection of objects,
  viii) $P_A$ and $P_B$ indicate a air of relatively compared objects with $P_A$ indicating the more preferred, and
  ix) R represents the total number of direct preference statements; and g) presenting, to the at least one user searcher during the at least one individual search session, at least one first relevancy-ordered hierarchy comprising the at least one large collection of objects resulting from the one search query, using the identified at least one relevancy order of the at least one large collection of objects.

2. The method according to claim 1, wherein the searcher overall evaluating comprises searcher-setting of at least one scalar relevancy-value or of at least one comparative relevancy-value relating to each object of the at least one sample subset.

3. The method according to claim 2, wherein the searcher-setting of the at least one scalar relevancy-value relating to each object of the at least one sample subset comprises the following steps of:
  a) searcher-assigning of the at least one scalar relevancy-value to at least one single object of the at least one sample subset;
  b) wherein the at least one scalar relevancy-value represents at least one measure of relative relevancy-value, of the at least one single object of the at least one sample subset, relative to an ideal most-relevant object being sought of the at least one user searcher.

4. The method according to claim 3, wherein the at least one scalar relevancy-value, relative to the searcher's ideal most-relevant object being sought, comprises a value-scale including negative values.

5. The method according to claim 3, wherein the at least one scalar relevancy-value, relative to the searcher's ideal most-relevant object being sought, comprises at least one choice among at least one natural-language positive expression and at least one natural-language negative expression.

6. The method according to claim 1, further comprising:
  a) after the presenting, to the at least one user searcher, the at least one relevancy-ordered hierarchy comprising the at least one large collection of objects, repeating steps (b) through (e) of claim 1; and
  b) performing a second presenting to the at least one user searcher of at least one second relevancy-ordered hierarchy comprising the at least one large collection of objects.

7. The method according to claim 6, further comprising n repeats of claim 1 steps by:
  after the performing an nth presenting to the at least one user searcher of at least one nth relevancy-ordered hierarchy comprising the at least one large collection of objects, performing an (n+1)th presenting to the at least one user searcher of at least one (n+1)th relevancy-ordered hierarchy comprising the at least one large collection of objects.

8. The method according to claim 1, wherein the step of, using the identified at least one user searcher evaluation subset of relevancy-ordered characteristics relating to the sampled objects, identifying at least one relevancy order of the at least one large collection of objects, comprises the following steps of:
  a) determining at least one individual relevancy weight value of each at least one object relating to the sampled objects;
  b) applying the at least one individual relevancy weight value, of each at least one object relating to the sampled objects, to each object-included characteristic, thereby setting individual relevancy weight values of each object-included characteristic; and
  c) obtaining at least one overall relevancy weight value relating to each valued object characteristic by combination of each at least one individual relevancy weight value of each object-included characteristic.

9. The method according to claim 8, wherein the step of identifying at least one relevancy order of the at least one large collection of objects further comprises the following step of applying the overall relevancy weight value relating to each valued object characteristic to the object characteristics within each object of the at least one large collection of objects so that, if a selected characteristic occurs at least once in the collection object, the overall relevancy weight value relating to the characteristic becomes an addend in the total relevancy score assigned to the collection of objects.

10. The method according to claim 8, wherein the step of obtaining at least one overall relevancy weight value relating to each valued object characteristic by combination of each at least one individual relevancy weight value of each object-included characteristic comprises the following step of determining at least one overall relevancy weight value of each valued object characteristic by using both additive and multiplicative weighting.

11. The method according to claim 10, wherein the step of applying algorithm to maximize $\epsilon$ is iteratively performed to approximate a searcher value function.

12. The method according to claim 1, wherein the searcher-setting of at least one comparative relevancy-value relating to each object of the at least one sample subset comprises the following steps of:
   a) searcher-assigning of at least one comparative the relevancy-value to at least two the single objects of the at least one sample subset;
   b) wherein the at least one comparative the relevancy-value represents at least one measure of relative relevancy-value, of the at least one first of the at least two single objects of the at least one sample subset, relative to the at least one second of the at least two single objects.

13. The method according to claim 12, wherein the at least one comparative the relevancy-value comprises at least one choice among at least one natural-language expression indicating more-relevancy-than and at least one natural-language expression indicating less-relevancy-than.

14. The method according to claim 13, wherein each natural language choice for each object is given a relative numerical scalar value; and each relative numerical scalar value is given a position in an overall numerical scalar value among objects evaluated.

15. The method according to claim 12, wherein:
   a) the objects comprise documents and the object characteristics comprise natural-language strings within the documents; and
   b) the at least one lesser-relevancy subset of the object characteristics comprise the natural-language strings less relevant to human searching for "topic" similarity.

16. The method according to claim 1, wherein the step of presenting to the at least one user searcher at least one large collection of objects comprising at least one set of object characteristics, each object comprising at least one subset of the at least one set of object characteristics, comprises
   a) relating to the at least one set of object characteristics, determining kinds of similarities among the at least one large collection of objects;
   b) clustering at least some of the at least one large collections of objects by at least some of the kinds of similarities; and
   c) presenting multiple resulting clusters of the objects to the at least one user searcher;
   d) wherein the at least one user searcher is enabled to value a potentially larger variety of the objects.

17. The method according to claim 1, further comprising, prior to the step of presenting to the at least one user searcher at least one large collection of objects comprising at least one set of object characteristics, each object comprising at least one subset of the at least one set of object characteristics, the following steps of:
   a) relating to the at least one set of object characteristics, determining kinds of similarities among the at least one large collection of objects;
   b) clustering at least some of the at least one large collections of objects by at least some of the kinds of similarities; and
   c) presenting multiple resulting clusters of the objects to the at least one user searcher;
   d) wherein the at least one user searcher is enabled to value a potentially larger variety of the objects.

18. The method according to claim 17, wherein the step of determining kinds of similarities among the at least one large collection of objects comprises the following steps of:
   a) identifying at least one lesser-relevancy subset of the object characteristics having less relevancy in determining relevant similarities among objects within the multiple resulting clusters of the objects; and
   b) performing the step of clustering at least some of the at least one large collections of objects by at least some of the kinds of similarities, only with respect to similarities relating to the object characteristics not within the identified at least one lesser-relevancy subset.

19. The method according to claim 1, further comprising the following step of defining at least one set of object characteristics assignable among the large collection of objects; wherein the step of defining at least one set of object characteristics is performed prior to the step of presenting to the at least one user searcher at least one large collection of objects comprising at least one set of object characteristics, each object comprising at least one subset of the at least one set of object characteristics.

20. A method, implemented by a computer system, relating to refining at least one document search by at least one user searcher during at least one individual search session, relating to finding documents relevant to the at least one search of the at least one user searcher during the at least one individual search session, comprising the following steps of:
   a) presenting to the at least one user searcher at least one large collection of documents comprising at least one set of document natural-language strings during the at least one individual search session, each document comprising at least one subset of the at least one set of document natural-language strings;
   b) wherein the at least one large collection of documents comprising at least one set of document natural-language strings during the at least one individual search session results from one search query of the at least one user searcher;
   c) gathering searcher overall evaluating relating to each single document of at least one sample subset of the at least one large collection of documents during the at least one individual search session;
   d) wherein the searcher overall evaluating comprises searcher-setting of at least one scalar relevancy-value or of at least one comparative relevancy-value for each document of the at least one sample subset during the at least one individual search session;
   e) using the gathered searcher overall evaluating relating to each single document of the at least one sample subset of the at least one large collection of documents, identifying at least one user searcher evaluation subset of relevancy-ordered document natural-language strings relating to the sampled documents;
   f) using the identified at least one user searcher evaluation subset of relevancy-ordered document natural-language strings relating to the sampled documents, identifying at least one relevancy order, approximating a preference function of the at least one user searcher, of the at least one large collection of documents resulting from the one search query, wherein the approximating the value function of the at least one user searcher comprises iterative application of the algorithm to maximizes $\epsilon$ subject to:

$$\sum_{i=1}^{M} w_i D_{ki} - \sum_{i=1}^{M} w_i D_{ji} \geq \varepsilon, \forall k \in S_t, j \in S_{t+1}, t = 1, \ldots, T-1$$

$$\sum_{i=1}^{M} w_i D_{ji}^{P_A} - \sum_{i=1}^{M} w_i D_{ji}^{P_B} \geq \varepsilon, j = 1, \ldots, R,$$

$$0 \leq w_i \leq 1, i = 1, \ldots, M$$

$$\varepsilon \geq 0$$

wherein
- i) i represents the valued object characteristic,
- ii) w represents the at least one overall relevancy weight value,
- iii) D represents an object described by an array of the valued object characteristics, and wherein D is at least one of additive form or multiplicative form, or any combination thereof,
- iv) $\varepsilon$ represents the difference between the weighted values of all objects in the at least one large collection of objects, $S_t$ represents the set of objects within a scalar category t,
- vi) T represents the total number of scalar categories,
- vii) M represents the total number of the valued object characteristics within the at least one large collection of objects,
- viii) $P_A$ and $P_B$ indicate a air of relatively compared objects with $P_A$ indicating the more preferred, and
- ix) R represents the total number of direct preference statements; and
- g) presenting, to the at least one user searcher during the at least one individual search session, at least one relevancy-ordered hierarchy of the at least one large collection of documents, resulting from the one search query, using the identified at least one relevancy order of the at least one large collection of objects.

21. The method according to claim 20, wherein the at least one large collection of documents relates to vehicles.

22. The method according to claim 20, wherein the at least one large collection of documents relates to romantic interests.

23. A computer-implemented method comprising the following steps of:
- a) gathering preference feedback, relating to at least one object from at least one large collection of objects, from at least one user searcher;
- b) approximating a value function of the at least one user searcher based on the gathered preference feedback; and
- c) ordering the at least one large collection of objects based on the approximation of the value function of the at least one user searcher;
- d) wherein the step of approximating the value function of the at least one user searcher comprises iterative application of the algorithm to maximize $\varepsilon$ subject to:

$$\sum_{i=1}^{M} w_i D_{ki} - \sum_{i=1}^{M} w_i D_{ji} \geq \varepsilon, \forall k \in S_t, j \in S_{t+1}, t = 1, \ldots, T-1$$

$$\sum_{i=1}^{M} w_i D_{ji}^{P_A} - \sum_{i=1}^{M} w_i D_{ji}^{P_B} \geq \varepsilon, j = 1, \ldots, R,$$

$$0 \leq w_i \leq 1, i = 1, \ldots, M$$

$$\varepsilon \geq 0$$

- e) wherein
  - i) i represents the valued object characteristic,
  - ii) w represents the at least one overall relevancy weight value,
  - iii) D represents an object described by an array of the valued object characteristics, and wherein D is at least one of additive form or multiplicative form, or any combination thereof,
  - iv) $\varepsilon$ represents the difference between the weighted values of all objects in the at least one large collection of objects,
  - v) $S_t$ represents the set of objects within a scalar category t,
  - vi) T represents the total number of scalar categories,
  - vii) M represents the total number of the valued object characteristics within the at least one large collection of objects,
  - viii) $P_A$ and $P_B$ indicate a pair of relatively compared objects with $P_A$ indicating the more preferred, and
  - ix) R represents the total number of direct preference statements; and
- f) wherein after the iterative application of the algorithm maximized $\varepsilon$, ordering the at least one large collection of objects based on the approximation of the value function of the at least one user searcher when occurs.

24. A computer system, relating to refining at least one search by at least one user searcher, relating to finding objects relevant to the at least one search of the at least one user searcher during at least one individual search session, comprising:
- a) at least one presenting computer interface adapted to present to the at least one user searcher at least one large collection of objects comprising at least one set of object characteristics during the at least one individual search session, each object comprising at least one subset of the at least one set of object characteristics;
- b) wherein the large collection of objects results from one search query of the at least one user searcher;
- c) at least one gathering computer interface adapted to gather searcher overall evaluating relating to each single object of at least one sample subset of the at least one large collection of objects;
- d) wherein the at least one gathering computer interface searcher overall evaluating comprises at least one gathering computer processor adapted to gather searcher-setting of at least one scalar relevancy-value or of at least one comparative relevancy-value relating to each object of the at least one sample subset during the at least one individual search session;
- e) at least one characteristic-evaluating computer processor, using the gathered searcher overall evaluating relating to each single object of the at least one sample subset of the at least one large collection of objects, adapted to identify at least one user searcher evaluation subset of relevancy-ordered characteristics relating to the sampled objects;
- f) at least one object-evaluating computer processor, using the identified at least one user searcher evaluation subset of relevancy-ordered characteristics relating to the sampled objects, adapted to identify at least one relevancy order, approximating a preference function of the at least one user searcher, of the at least one large collection of objects resulting from the one search query, wherein the approximating the value function of the at least one user searcher comprises iterative application of the algorithm to maximize $\varepsilon$ subject to:

$$\sum_{i=1}^{M} w_i D_{ki} - \sum_{i=1}^{M} w_i D_{ji} \geq \varepsilon, \forall k \in S_t, j \in S_{t+1}, t = 1, \ldots, T-1$$

$$\sum_{i=1}^{M} w_i D_{ji}^{P_A} - \sum_{i=1}^{M} w_i D_{ji}^{P_B} \geq \varepsilon, j = 1, \ldots, R,$$

$$0 \leq w_i \leq 1, i = 1, \ldots, M$$

$$\varepsilon \geq 0$$

wherein
- i) i represents the valued object characteristic,
- ii) w represents the at least one overall relevancy weight value,
- iii) D represents an object described by an array of the valued object characteristics, and wherein D is at least one of additive form or multiplicative form, or any combination thereof,
- iv) $\varepsilon$ represents the difference between the weighted values of all objects in the at least one large collection of objects,
- v) $S_t$ represents the set of objects within a scalar category t,
- vi) T represents the total number of scalar categories,
- vii) M represents the total number of the valued object characteristics within the at least one large collection of objects,
- viii) $P_A$ and $P_B$ indicate a air of relatively compared with $P_A$ indicating the more preferred, and
- ix) R represents the total number of direct preference statements; and g) at least one re-presenting computer interface adapted to present, to the at least one user searcher during the at least one individual search session, at least one first relevancy-ordered hierarchy comprising the at least one large collection of objects resulting from the one search query, using the identified at least one relevancy order of the at least one large collection of objects.

25. The computer system according to claim 24, further comprising:
a) at least one computer processor structured and arranged to repeat the following steps:
- i) gathering searcher overall evaluating relating to each single object of the at least one sample subset of the at least one large collection of objects;
- ii) wherein the searcher overall evaluating comprises searcher-setting of at least one relevancy-value relating to each object of the at least one sample subset;
- iii) using the gathered searcher overall evaluating relating to each single object of the at least one sample subset of the at least one large collection of objects, identifying at least one user searcher evaluation subset of relevancy-ordered characteristics relating to the sampled objects;
- iv) using the identified at least one user searcher evaluation subset of relevancy-ordered characteristics relating to the sampled objects, identifying at least one relevancy order of the at least one large collection of objects;

b) at least one second re-presenting interface adapted to present, to the at least one user searcher, at least one second relevancy-ordered hierarchy comprising the at least one large collection of objects.

26. A computer system, relating to refining at least one search by at least one user searcher during at least one individual search session, relating to finding objects relevant to the at least one search of the at least one user searcher, comprising:
a) means for presenting to the at least one user searcher at least one large collection of objects comprising at least one set of object characteristics during the at least one individual search session, each object comprising at least one subset of the at least one set of object characteristics;
b) wherein the large collection of objects results from one search query of the at least one user searcher;
c) means for gathering searcher overall evaluating relating to each single object of at least one sample subset of the at least one large collection of objects;
d) wherein the searcher overall evaluating comprises searcher-setting of at least one relevancy-value relating to each object of the at least one sample subset;
e) means for using the gathered searcher overall evaluating relating to each single object of the at least one sample subset of the at least one large collection of objects, identifying at least one user searcher evaluation subset of relevancy-ordered characteristics relating to the sampled objects;
f) means for, using the identified at least one user searcher evaluation subset of relevancy-ordered characteristics relating to the sampled objects, identifying at least one relevancy order, approximating a preference function of the at least one user searcher, of the at least one large collection of objects resulting from the one search query, wherein the approximating the value function of the at least one user searcher comprises iterative application of the algorithm to maximizes $\varepsilon$ subject to:

$$\sum_{i=1}^{M} w_i D_{ki} - \sum_{i=1}^{M} w_i D_{ji} \geq \varepsilon, \forall k \in S_t, j \in S_{t+1}, t = 1, \ldots, T-1$$

$$\sum_{i=1}^{M} w_i D_{ji}^{P_A} - \sum_{i=1}^{M} w_i D_{ji}^{P_B} \geq \varepsilon, j = 1, \ldots, R,$$

$$0 \leq w_i \leq 1, i = 1, \ldots, M$$

$$\varepsilon \geq 0$$

wherein
- i) i represents the valued object characteristic,
- ii) w represents the at least one overall relevancy weight value,
- iii) D represents an object described by an array of the valued object characteristics, and wherein D is at least one of additive form or multiplicative form, or any combination thereof,
- iv) $\varepsilon$ represents the difference between the weighted values of all objects in the at least one large collection of objects,
- v) $S_t$ represents the set of objects within a scalar category t,
- vi) T represents the total number of scalar categories,
- vii) M represents the total number of the valued object characteristics within the at least one large collection of objects,
- viii) $P_A$ and $P_B$ indicate a pair of relatively compared objects with $P_A$ indicating the more preferred, and
- ix) R represents the total number of direct preference statements; and g) means for presenting, to the at least one user searcher during the at least one individual search session, at least one first relevancy-ordered hierarchy comprising the at least one large collection of objects resulting from the one search query, using the identified at least one relevancy order of the at least one large collection of objects.

27. The computer system according to claim 26, wherein the searcher overall evaluating comprises means for searcher-setting of at least one of scalar relevancy-value or of at least one comparative relevancy-value relating to each object of the at least one sample subset.

28. The computer system according to claim 27, wherein the means for searcher-setting of the at least one scalar relevancy-value relating to each object of the at least one sample subset comprises:
   a) means for searcher-assigning of the at least one scalar relevancy-value to at least one single object of the at least one sample subset;
   b) wherein the at least one scalar relevancy-value represents at least one measure of relative relevancy-value, of the at least one single object of the at least one sample subset, relative to an ideal most-relevant object being sought by the at least one user searcher.

29. The computer system according to claim 28, wherein the at least one scalar relevancy-value, relative to the searcher's ideal most-relevant object being sought, comprises a value-scale including negative values.

30. The computer system according to claim 28, wherein the at least one scalar relevancy-value, relative to the searcher's ideal most-relevant object being sought, comprises at least one choice among at least one natural-language positive expression and at least one natural-language negative expression.

31. The computer system according to claim 27, wherein the means for searcher-setting of at least one comparative relevancy-value relating to each object of the at least one sample subset comprises:
   a) means for searcher-assigning of the at least one comparative relevancy-value to at least two the single objects of the at least one sample subset;
   b) wherein the at least one comparative the relevancy-value represents at least one measure of relative relevancy-value, of the at least one first of the at least two single objects of the at least one sample subset, relative to the at least one second of the at least two single objects.

32. The computer system according to claim 31, wherein the at least one comparative the relevancy-value comprises at least one choice among at least one natural-language expression indicating more-relevancy-than and at least one natural-language expression indicating less-relevancy-than.

33. The computer system according to claim 32, wherein each natural language choice for each object is given a relative numerical scalar value; and each relative numerical scalar value is given a position in an overall numerical scalar value among objects evaluated.

34. The computer system according to claim 26, further comprising:
   a) means for, after the presenting, to the at least one user searcher, the at least one relevancy-ordered hierarchy comprising the at least one large collection of objects, repeating computer processing of elements (b) through (e) of claim 28; and
   b) means for performing a second presenting to the at least one user searcher of at least one second relevancy-ordered hierarchy comprising the at least one large collection of objects.

35. The computer system according to claim 34, further computer processing n repeats of claim 28, further comprising:
   means for performing an (n+1)th presenting to the at least one user searcher of at least one (n+1)th relevancy-ordered hierarchy comprising the at least one large collection of objects, after an nth presenting to the at least one user searcher of at least one nth relevancy-ordered hierarchy comprising the at least one large collection of objects.

36. The computer system according to claim 26, wherein the means for, using the identified at least one user searcher evaluation subset of relevancy-ordered characteristics relating to the sampled objects, identifying at least one relevancy order of the at least one large collection of objects, comprises:
   a) means for determining at least one individual relevancy weight value of each at least one object relating to the sampled objects;
   b) means for applying the at least one individual relevancy weight value, of each at least one object relating to the sampled objects, to each object-included characteristic, thereby setting individual relevancy weight values of each object-included characteristic; and
   c) means for obtaining at least one overall relevancy weight value relating to each valued object characteristic by combination of each at least one individual relevancy weight value of each object-included characteristic.

37. The computer system according to claim 36, wherein the means for identifying at least one relevancy order of the at least one large collection of objects further comprises:
   means for applying the overall relevancy weight value relating to each valued object characteristic to the object characteristics within each object of the at least one large collection of objects so that, if a selected characteristic occurs at least once in the collection object, the overall relevancy weight value relating to the characteristic becomes an addend in the total relevancy score assigned to the collection of objects.

38. The computer system according to claim 37, wherein the means for obtaining at least one overall relevancy weight value relating to each valued object characteristic by combination of each at least one individual relevancy weight value of each object-included characteristic comprises:
   means for determining at least one overall relevancy weight value of each valued object characteristic by using both additive and multiplicative weighting.

39. The computer system according to claim 38, comprising means for iteratively applying algorithm to maximize $\epsilon$ to approximate a value function of the searcher.

40. The computer system according to claim 26, wherein the means for presenting to the at least one user searcher at least one large collection of objects comprising at least one set of object characteristics, each object comprising at least one subset of the at least one set of object characteristics, comprises
   a) means for, relating to the at least one set of object characteristics, determining kinds of similarities among the at least one large collection of objects;
   b) means for clustering at least some of the at least one large collections of objects by at least some of the kinds of similarities; and
   c) means for presenting multiple resulting clusters of the objects to the at least one user searcher;
   d) wherein the at least one user searcher is enabled to value a potentially larger variety of the objects.

41. The computer system according to claim 26, further comprising, prior to operation of the means for presenting to the at least one user searcher at least one large collection of objects comprising at least one set of object characteristics, each object comprising at least one subset of the at least one set of object characteristics:
   a) means for, relating to the at least one set of object characteristics, determining kinds of similarities among the at least one large collection of objects;
   b) means for clustering at least some of the at least one large collections of objects by at least some of the kinds of similarities; and
   c) means for presenting multiple resulting clusters of the objects to the at least one user searcher;
   d) wherein the at least one user searcher is enabled to value a potentially larger variety of the objects.

42. The computer system according to claim 41, wherein the means for determining kinds of similarities among the at least one large collection of objects comprises:
   a) means for identifying at least one lesser-relevancy subset of the object characteristics shaving less relevancy in determining relevant similarities among objects within the multiple resulting clusters of the objects; and
   b) means for performing the step, of clustering at least some of the at least one large collections of objects by at least some of the kinds of similarities, only with respect to similarities relating to the object characteristics not within the identified at least one lesser-relevancy subset.

43. The computer system according to claim 42, wherein:
   a) the objects comprise documents and the object characteristics comprise natural-language strings within the documents; and
   b) the at least one lesser-relevancy subset of the object characteristics comprise the natural-language strings less relevant to human searching for "topic" similarity.

44. A computer system, relating to refining at least one document search by at least one user searcher during at least one individual search session, relating to finding documents relevant to the at least one search of the at least one user searcher, comprising:
   a) means for presenting to the at least one user searcher during the at least one individual search session at least one large collection of documents comprising at least one set of document natural-language strings, each document comprising at least one subset of the at least one set of document natural-language strings;
   b) wherein the large collection of objects results from one search query of the at least one user searcher;
   c) means for gathering searcher overall evaluating relating to each single document of at least one sample subset of the at least one large collection of documents;
   d) wherein the searcher overall evaluating comprises searcher-setting of at least one scalar relevancy-value or of at least one comparative relevancy-value for each document of the at least one sample subset;
   e) means for, using the gathered searcher overall evaluating relating to each single document of the at least one sample subset of the at least one large collection of documents, identifying at least one user searcher evaluation subset of relevancy-ordered document natural-language strings relating to the sampled documents;
   f) means for, using the identified at least one user searcher evaluation subset of relevancy-ordered document natural-language strings relating to the sampled documents, identifying at least one relevancy order, approximating a preference function of the at least one user searcher, of the at least one large collection of documents resulting from the one search query, wherein the approximating the value function of the at least one user searcher comprises iterative application of the algorithm to maximize $\epsilon$ subject to:

$$\sum_{i=1}^{M} w_i D_{ki} - \sum_{i=1}^{M} w_i D_{ji} \geq \varepsilon, \forall k \in S_t, j \in S_{t+1}, t = 1, \ldots, T-1$$

$$\sum_{i=1}^{M} w_i D_{ji}^{P_A} - \sum_{i=1}^{M} w_i D_{ji}^{P_B} \geq \varepsilon, j = 1, \ldots, R,$$

$$0 \leq w_i \leq 1, i = 1, \ldots, M$$

$$\varepsilon \geq 0$$

wherein
   i) i represents the valued object characteristic,
   ii) w represents the at least one overall relevancy weight value,
   iii) D represents an object described by an array of the valued object characteristics, and wherein D is at least one of additive form or multiplicative form, or any combination thereof,
   iv) $\epsilon$ represents the difference between the weighted values of all objects in the at least one large collection of objects,
   v) $S_t$ represents the set of objects within a scalar category t,
   vi) T represents the total number of scalar categories,
   vii) M represents the total number of the valued object characteristics within the at least one large collection of objects,
   viii) $P_A$ and $P_B$ indicate a air of relatively compared objects with $P_A$ indicating the more preferred, and
   ix) R represents the total number of direct preference statements; and
   g) means for presenting, to the at least one user searcher, at least one relevancy-ordered hierarchy of the at least one large collection of documents resulting from the one search query, using the identified at least one relevancy order of the at least one large collection of objects.

45. A method, implemented by a computer system, relating to refining at least one search by at least one user searcher during at least one individual search session, relating to finding objects relevant to the at least one search of the at least one user searcher, comprising the following steps of:
   a) presenting to the at least one user searcher during the at least one individual search session at least one large collection of objects comprising at least one set of object characteristics, each object comprising at least one subset of the at least one set of object characteristics;
   b) wherein the large collection of objects results from one search query of the at least one user searcher;
   c) gathering searcher overall evaluating relating to each single object of at least one sample subset of the at least one large collection of objects during the at least one individual search session;
   d) wherein the searcher overall evaluating comprises searcher-setting of at least one scalar relevancy-value or of at least one comparative relevancy-value relating to each object of the at least one sample subset during the at least one individual search session;
   e) using the gathered searcher overall evaluating relating to each single object of the at least one sample subset of the at least one large collection of objects, identifying at least one user searcher evaluation subset of relevancy-ordered characteristics relating to the sampled objects during the at least one individual search session;
   f) using the identified at least one user searcher evaluation subset of relevancy-ordered characteristics relating to the sampled objects, identifying at least one relevancy order, approximating a preference function of the at least one user searcher during the at least one individual search session, of the at least one large collection of objects, wherein the approximating the value function of the at least one user searcher comprises iterative application of the algorithm to maximize $\epsilon$ subject to:

$$\sum_{i=1}^{M} w_i D_{ki} - \sum_{i=1}^{M} w_i D_{ji} \geq \varepsilon, \forall k \in S_t, j \in S_{t+1}, t = 1, \ldots, T-1$$

$$\sum_{i=1}^{M} w_i D_{ji}^{P_A} - \sum_{i=1}^{M} w_i D_{ji}^{P_B} \geq \varepsilon, j = 1, \ldots, R,$$

$$0 \leq w_i \leq 1, i = 1, \ldots, M$$

$$\varepsilon \geq 0$$

wherein
  i) i represents the valued object characteristic,
  ii) w represents the at least one overall relevancy weight value,
  iii) D represents an object described by an array of the valued object characteristics, and wherein D is at least one of additive form or multiplicative form, or any combination thereof,
  iv) $\epsilon$ represents the difference between the weighted values of all objects in the at least one large collection of objects,
  v) $S_t$ represents the set of objects within a scalar category t,
  vi) T represents the total number of scalar categories,
  vii) M represents the total number of the valued object characteristics within the at least one large collection of objects,
  viii) $P_A$ and $P_B$ indicate a air of relatively compared objects with $P_A$ indicating the more preferred, and
  ix) R represents the total number of direct preference statements; and
g) presenting, to the at least one user searcher during the at least one individual search session, at least one first relevancy-ordered hierarchy comprising the at least one large collection of objects, using the identified at least one relevancy order of the at least one large collection of objects.

* * * * *